(12) United States Patent
Imamura et al.

(10) Patent No.: US 10,955,050 B2
(45) Date of Patent: Mar. 23, 2021

(54) DRIVE CONTROL DEVICE FOR VEHICLE AND CONTROL METHOD FOR VEHICLE

(71) Applicant: Toyota Jidosha Kabushiki Kaisha, Toyota (JP)

(72) Inventors: Tatsuya Imamura, Okazaki (JP); Yasuhiro Oshiumi, Gotemba (JP); Kazuma Aoki, Shizuoka-ken (JP); Yukari Okamura, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 16/274,750

(22) Filed: Feb. 13, 2019

(65) Prior Publication Data
US 2019/0248356 A1 Aug. 15, 2019

(30) Foreign Application Priority Data
Feb. 14, 2018 (JP) .............................. JP2018-023762

(51) Int. Cl.
| F16H 61/16 | (2006.01) |
| B60W 20/17 | (2016.01) |
| B60K 6/445 | (2007.10) |
| B60K 6/387 | (2007.10) |
| B60W 10/08 | (2006.01) |
| B60W 10/06 | (2006.01) |
| B60K 6/365 | (2007.10) |
| B60W 10/02 | (2006.01) |
| B60W 10/115 | (2012.01) |
| F16H 61/682 | (2006.01) |
| F16H 61/02 | (2006.01) |

(Continued)

(52) U.S. Cl.
CPC .............. F16H 61/16 (2013.01); B60K 6/365 (2013.01); B60K 6/387 (2013.01); B60K 6/445 (2013.01); B60W 10/02 (2013.01); B60W 10/06 (2013.01); B60W 10/08 (2013.01); B60W 10/115 (2013.01); B60W 20/17 (2016.01); F16H 59/44 (2013.01); F16H 59/48 (2013.01); F16H 61/0204 (2013.01); F16H 61/682 (2013.01); B60W 2520/10 (2013.01); B60W 2520/105 (2013.01); B60Y 2400/421 (2013.01)

(58) Field of Classification Search
CPC ................. B60W 20/17; B60W 10/02; B60W 10/11–115; B60W 2520/10; B60W 2520/105; F16H 61/0204; F16H 61/16; F16H 59/44; F16H 59/48
See application file for complete search history.

(56) References Cited

U.S. PATENT DOCUMENTS

2008/0122391 A1  5/2008  Iwase et al.
2017/0313187 A1  11/2017  Weidemann et al.

FOREIGN PATENT DOCUMENTS

JP   2017149243 A   8/2017

Primary Examiner — Erin D Bishop
(74) Attorney, Agent, or Firm — Dinsmore & Shohl LLP

(57) ABSTRACT

A drive control device for a vehicle is configured: to determine whether or not a sound pressure level inside a vehicle cabin becomes a predetermined value or less, under a state where it is predicted that a meshing-type engagement mechanism is changed from a disengaged state to an engaged state; and to prohibit the meshing-type engagement mechanism from entering the disengaged state, when it is determined that the sound pressure level becomes the predetermined value or less. In the disengaged state, transmission of a power output from a driving force source to driving wheels as drive energy is interrupted.

14 Claims, 14 Drawing Sheets

(51) Int. Cl.
*F16H 59/48* (2006.01)
*F16H 59/44* (2006.01)

FIG. 5

| RUNNING MODE | | CL1 | CL2 | B1 | MG1 | MG2 | ENG |
|---|---|---|---|---|---|---|---|
| HV RUNNING MODE | HV-Lo MODE | E | D | D | G | M | ON |
| | HV-Hi MODE | D | E | D | G | M | ON |
| | DIRECT-CONNECTION MODE | E | E | D | | | ON |
| EV RUNNING MODE | DUAL MODE EV-Lo MODE | E | D | E | M | M | OFF |
| | DUAL MODE EV-Hi MODE | D | E | E | M | M | OFF |
| | SINGLE MODE | D | D | D | | M | OFF |

DRIVE CONTROL DEVICE FOR VEHICLE AND CONTROL METHOD FOR VEHICLE

CROSS-REFERENCE TO RELATED APPLICATION

This application claims priority to Japanese Patent Application No. 2018-023762 filed on Feb. 14, 2018, incorporated herein by reference in its entirety.

BACKGROUND

1. Technical Field

The disclosure relates to a drive control device for a vehicle including a meshing-type engagement mechanism configured to selectively transmit or interrupt a torque between a driving force source and driving wheels, and also relates to a control method of the vehicle.

2. Description of Related Art

Japanese Unexamined Patent Application Publication No. 2017-149243 (JP 2017-149243 A) describes a drive control device for a vehicle including two planetary gear mechanisms and two engagement mechanisms. The vehicle is configured such that, when one of the engagement mechanisms is engaged, one rotating element of one of the planetary gear mechanisms is connected to one rotating element of the other one of the planetary gear mechanisms, so as to form a compound planetary gear mechanism as a whole, and when the one of the engagement mechanisms is engaged, a low mode in which a torque transmitted from an engine to driving wheels is large is set. Further, the vehicle is configured such that, when the other one of the engagement mechanisms is engaged, two rotating elements of the one of the planetary gear mechanisms are engaged, and when the other one of the engagement mechanisms is engaged, a high mode in which the torque transmitted from the engine to the driving wheels is small is set. The drive control device described in JP 2017-149243 A is configured to change from the high mode to the low mode when a parking range is set or while the vehicle stops, in order to reduce gear rattle noise of a gear or the like constituting a torque transmission path between the engine and the driving wheels. The vehicle described in JP 2017-149243 A includes a motor directly connected to the driving wheels.

SUMMARY

In the vehicle described in JP 2017-149243 A, when the engagement mechanisms are disengaged and the motor directly connected to the driving wheels is driven, the vehicle can run without dragging and rotating the engine and the motor that outputs a reaction force torque of the planetary gear mechanisms, thereby making it possible to reduce an amount of consumed electric power. In the meantime, in a case where it is requested to start the engine regardless of a running state for the purpose of warming-up of the engine or the like, the one of the engagement mechanisms is engaged. In a case where the one of the engagement mechanisms is constituted by a meshing-type engagement mechanism, engagement noise inevitably occurs due to contact or the like of dog teeth at the time of meshing. Accordingly, when the meshing-type engagement mechanism is engaged under a state where a sound pressure level inside a vehicle cabin is low, e.g., a state where road noise is small at the time when the vehicle stops or the vehicle runs at a low speed or a state where the engine is stopped, an occupant can hear the engagement noise outstandingly, so that the occupant may have an uncomfortable feeling.

The disclosure provides a drive control device for a vehicle and a control method for a vehicle each of which can engage a meshing-type engagement mechanism without causing an occupant to have an uncomfortable feeling.

A first aspect of the disclosure relates to a drive control device for a vehicle. The vehicle includes: a driving force source; and a meshing-type engagement mechanism configured to selectively set an engaged state or a disengaged state. The engaged state is a state where a power output from the driving force source is transmittable to driving wheels as drive energy. The disengaged state is a state where the transmission of the power to the driving wheels as the drive energy is interrupted. The vehicle is configured to change the meshing-type engagement mechanism from the disengaged state to the engaged state by changing from a predetermined running state to another running state. The drive control device includes a controller configured to control the meshing-type engagement mechanism. The controller is configured to determine whether or not a sound pressure level inside a vehicle cabin becomes a predetermined value or less, under a state where it is predicted that the meshing-type engagement mechanism is changed from the disengaged state to the engaged state. The controller is configured to prohibit the meshing-type engagement mechanism from entering the disengaged state, when the controller determines that the sound pressure level becomes the predetermined value or less.

In the drive control device, when a vehicle speed is a predetermined vehicle speed or less, the controller may be configured to determine that the sound pressure level becomes the predetermined value or less.

In the drive control device, when a deceleration of the vehicle is a predetermined deceleration or more, the controller may be configured to determine that the sound pressure level becomes the predetermined value or less.

In the drive control device, when a deceleration of the vehicle is a predetermined deceleration or more, the controller may be configured to determine that the sound pressure level becomes the predetermined value or less. The predetermined deceleration may be determined to be higher as the vehicle speed is higher.

In the drive control device, the driving force source may include an engine. The driving force source may further include a drive motor connected to the driving wheels.

The drive control device may further include a generator configured to convert a power output from the engine into electrical energy and output the electrical energy to the drive motor. The meshing-type engagement mechanism may be configured to selectively interrupt transmission of a torque between the engine and the generator.

The drive control device may further include a power split device that includes a first rotating element to which the engine is connected, a second rotating element to which the generator is connected, and a third rotating element to which the driving wheels are connected. The power split device may be configured to split and transmit a torque output from the engine to the generator and the driving wheels. The meshing-type engagement mechanism may be configured to selectively interrupt the transmission of the torque from the engine to the driving wheels via the power split device.

In the drive control device, the power split device may include: a plurality of rotating elements including the first rotating element, the second rotating element, and the third rotating element; a first engagement mechanism configured to connect a first set of any two rotating elements among the rotating elements so that a split ratio of the torque transmitted to the driving wheels side becomes a first split ratio; and a second engagement mechanism configured to connect a second set of any two rotating elements among the rotating elements so that the split ratio becomes a second split ratio smaller than the first split ratio. The meshing-type engagement mechanism may include the first engagement mechanism.

In the drive control device, one rotating element out of the two rotating elements engaged by the first engagement mechanism and one rotating element out of the two rotating elements engaged by the second engagement mechanism may be the same rotating element.

In the drive control device, the driving force source may include a drive motor. The meshing-type engagement mechanism may be configured to selectively interrupt transmission of a torque between the drive motor and the driving wheels.

The drive control device may further include: a third engagement mechanism configured to connect the drive motor to the driving wheels in a torque transmittable manner by connecting a first pair of rotational members so that a transmission ratio between the drive motor and the driving wheels becomes a first predetermined value; and a fourth engagement mechanism configured to connect the drive motor to the driving wheels in a torque transmittable manner by connecting a second pair of rotational members so that the transmission ratio between the drive motor and the driving wheels becomes a second predetermined value smaller than the first predetermined value. The meshing-type engagement mechanism may include the third engagement mechanism.

In the drive control device, the meshing-type engagement mechanism may be a normal-stay type engagement mechanism configured as follows. The meshing-type engagement mechanism may be configured to change from the disengaged state to the engaged state upon receipt of an engagement signal to change from the disengaged state to the engaged state where a torque is transmittable between the driving force source and the driving wheels. The meshing-type engagement mechanism may be configured to change from the engaged state to the disengaged state upon receipt of a disengagement signal to change from the engaged state to the disengaged state. When the engagement signal and the disengagement signal are not input in the engaged state, the meshing-type engagement mechanism may be configured to maintain the engaged state. When the engagement signal and the disengagement signal are not input in the disengaged state, the meshing-type engagement mechanism may be configured to maintain the disengaged state.

In the drive control device, the meshing-type engagement mechanism may include an input-side rotational member including first meshing teeth, and an output-side rotational member including second meshing teeth meshing with the first meshing teeth. The meshing-type engagement mechanism may be configured to move either ones of the first meshing teeth and the second meshing teeth toward the other ones of the first meshing teeth and the second meshing teeth, so that the first meshing teeth mesh with the second meshing teeth. The meshing-type engagement mechanism may be configured such that, when distal ends of the first meshing teeth in a moving direction make contact with the second meshing teeth at the time when the first meshing teeth start to mesh with the second meshing teeth, at least either one of the input-side rotational member and the output-side rotational member rotates to shift a phase of the first meshing teeth from a phase of the second meshing teeth, so that the first meshing teeth mesh with the second meshing teeth.

A second aspect of the disclosure relates to a control method for a vehicle. The vehicle includes a driving force source, a meshing-type engagement mechanism, and a controller. The meshing-type engagement mechanism is configured to selectively set an engaged state or a disengaged state. The engaged state is a state where a power output from the driving force source is transmittable to driving wheels as drive energy. The disengaged state is a state where the transmission of the power to the driving wheels as the drive energy is interrupted. The vehicle is configured to change the meshing-type engagement mechanism from the disengaged state to the engaged state by changing from a predetermined running state to another running state. The control method includes: controlling, by the controller, the meshing-type engagement mechanism; determining, by the controller, whether or not a sound pressure level inside a vehicle cabin becomes a predetermined value or less, under a state where it is predicted that the meshing-type engagement mechanism is changed from the disengaged state to the engaged state; and prohibiting, by the controller, the meshing-type engagement mechanism from entering the disengaged state, when the controller determines that the sound pressure level becomes the predetermined value or less.

In the above configuration, in a case where the sound pressure level inside the vehicle cabin becomes the predetermined sound pressure level or less, the meshing-type engagement mechanism is prohibited from entering the disengaged state where the transmission of the power output from the driving force source to the driving wheels as the drive energy is interrupted. Accordingly, it is possible to engage the meshing-type engagement mechanism under a state where the sound pressure level inside the vehicle cabin is small. In other words, it is possible to engage the meshing-type engagement mechanism under a state where the sound pressure level inside the vehicle cabin is relatively high. On this account, even if engagement noise occurs at the time when the meshing-type engagement mechanism is engaged, it is possible to restrain an occupant from having an uncomfortable feeling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram collectively illustrating engaged and disengaged states of clutch mechanisms and a braking mechanism, operating states of motors, and a driving state of an engine in various running modes;

DETAILED DESCRIPTION

Figure 1:
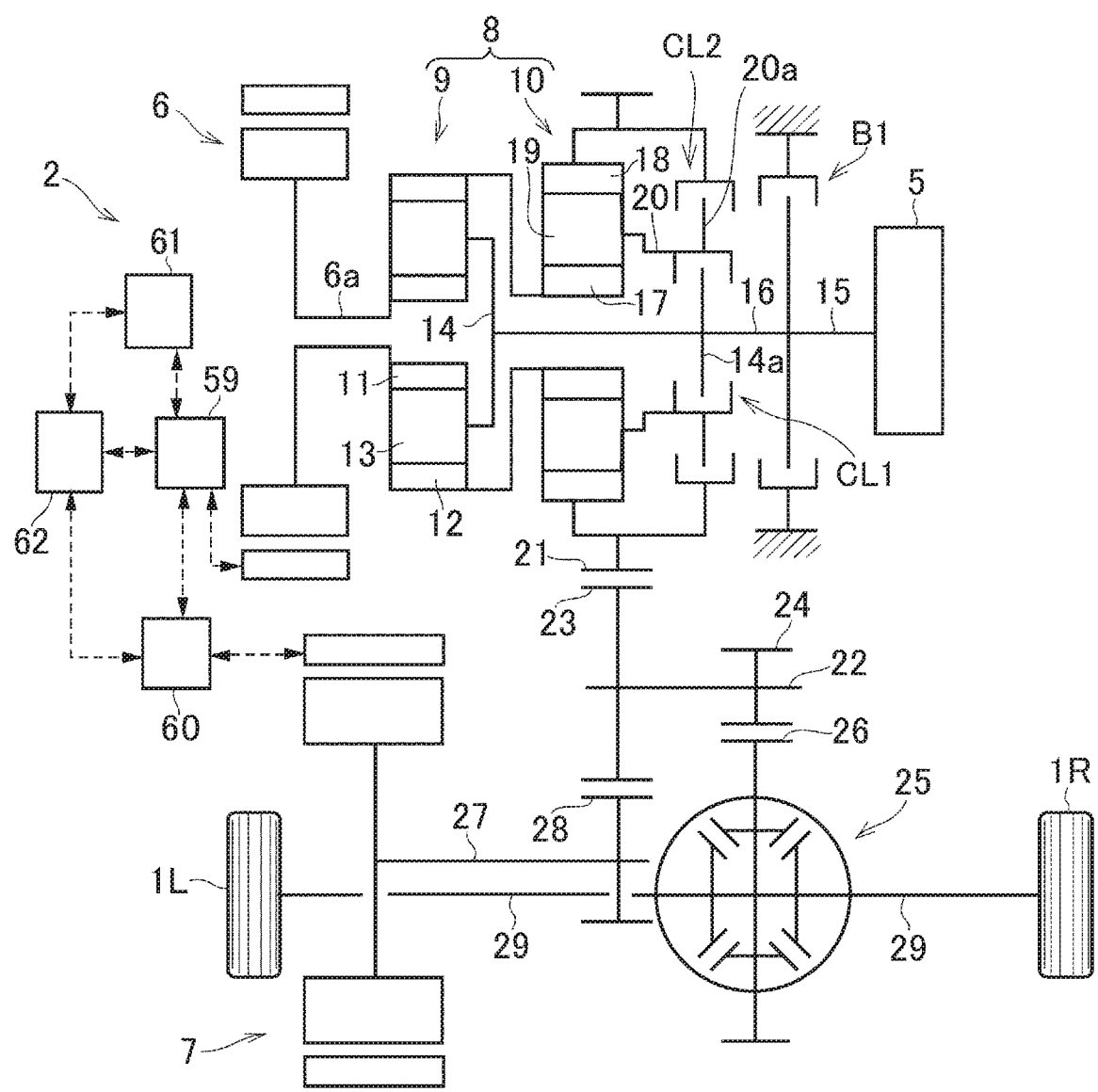
FIG. 1 is a skeleton diagram to describe an example of a first driving device.
Figure 2:
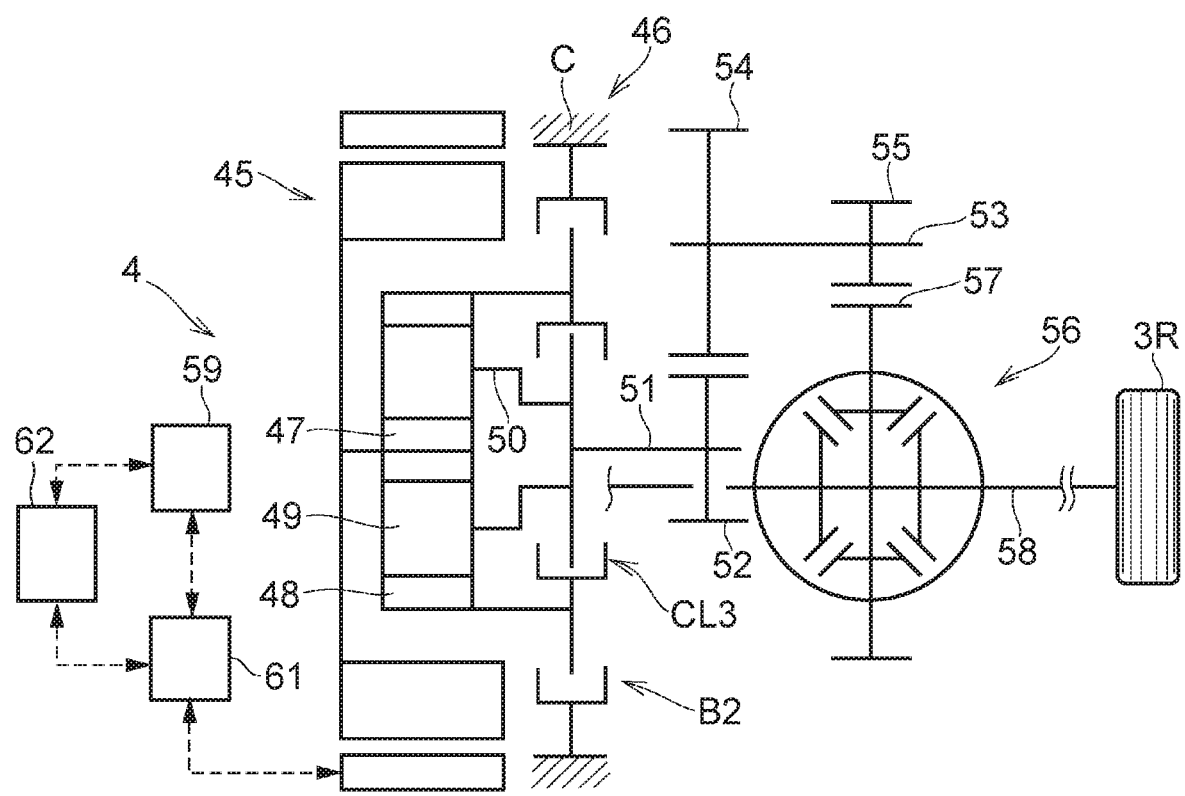
FIG. 2 is a skeleton diagram to describe an example of a second driving device.

One example of a vehicle in an embodiment of the disclosure will be described with reference to FIGS. 1 and 2. FIG. 1 illustrates a first driving device 2 for driving front wheels 1R, 1L, and FIG. 2 illustrates a second driving device 4 for driving rear wheels 3R, 3L. The first driving device 2 is a so-called two-motor type driving device including an engine 5 and two motors 6, 7 as driving force sources. The first motor 6 is constituted by a motor (that is, a motor generator: MG1) having a power generation function. The rotation number of the engine 5 is controlled by the first motor 6, and the second motor 7 is driven by an electric power generated by the first motor 6, so that a driving torque output from the second motor 7 is added to a driving torque for running. Note that the second motor 7 can be constituted by a motor (that is, a motor generator: MG2) having a power generation function. The engine 5 is one example of a "driving force source." The first motor 6 is one example of a "generator." The second motor 7 is one example of a "drive motor."

A power split device 8 is connected to the engine 5. The power split device 8 is constituted by a split portion 9 mainly having a function to split a torque output from the engine 5 into the first motor 6 side and an output side, and a transmission portion 10 mainly having a function to change a split ratio of the torque.

The split portion 9 should be configured to perform a differential action by three rotating elements, and a planetary gear mechanism can be employed. In the example illustrated in FIG. 1, the split portion 9 is constituted by a single-pinion type planetary gear mechanism. The split portion 9 illustrated in FIG. 1 is constituted by a sun gear 11, a ring gear 12 that is an internal gear placed concentrically to the sun gear 11, a pinion gear 13 placed between the sun gear 11 and the ring gear 12 so as to mesh with the sun gear 11 and the ring gear 12, and a carrier 14 that holds the pinion gear 13 so that the pinion gear 13 can rotate and revolve. The sun gear 11 mainly functions as a reaction force element, the ring gear 12 mainly functions as an output element, and the carrier 14 mainly functions as an input element.

A power output from the engine 5 is input into the carrier 14. More specifically, an input shaft 16 of the power split device 8 is connected to an output shaft 15 of the engine 5, and the input shaft 16 is connected to the carrier 14. Note that, instead of the configuration in which the carrier 14 is directly connected to the input shaft 16, the carrier 14 may be connected to the input shaft 16 via a transmission mechanism such as a gear mechanism. Further, a mechanism such as a damper mechanism or a torque converter may be placed between the output shaft 15 and the input shaft 16.

The first motor 6 is connected to the sun gear 11. In the example illustrated in FIG. 1, the split portion 9 and the first motor 6 are placed on the same axis as the rotation central axis of the engine 5, and the first motor 6 is placed on the opposite side from the engine 5 across the split portion 9. The transmission portion 10 is provided between the split portion 9 and the engine 5 so as to be placed on the same axis as the split portion 9 and the engine 5 such that the transmission portion 10 is aligned with the split portion 9 and the engine 5 along the direction of the axis.

The transmission portion 10 is constituted by a single-pinion type planetary gear mechanism. The transmission portion 10 is constituted by a sun gear 17, a ring gear 18 that is an internal gear placed concentrically to the sun gear 17, a pinion gear 19 placed between the sun gear 17 and the ring gear 18 so as to mesh with the sun gear 17 and the ring gear 18, and a carrier 20 that holds the pinion gear 19 so that the pinion gear 19 can rotate and revolve. The transmission portion 10 is a differential mechanism configured to perform a differential action by three rotating elements, i.e., the sun gear 17, the ring gear 18, and the carrier 20. The ring gear 12 of the split portion 9 is connected to the sun gear 17 of the transmission portion 10. Further, an output gear 21 is connected to the ring gear 18 of the transmission portion 10.

A first clutch mechanism CL1 is provided so that the split portion 9 and the transmission portion 10 constitute a compound planetary gear mechanism. The first clutch mechanism CL1 is configured to selectively connect the carrier 20 of the transmission portion 10 to the carrier 14 of the split portion 9. More specifically, the input shaft 16 is provided with a rotary disk 14a, and the first clutch mechanism CL1 is provided so as to engage the rotary disk 14a with the carrier 20 of the transmission portion 10. The first clutch mechanism CL is constituted by a meshing-type clutch mechanism configured to transmit a torque by meshing dog teeth with each other. By engaging the first clutch mechanism CL1, the carrier 14 of the split portion 9 is connected to the carrier 20 of the transmission portion 10 so that the carrier 14 and the carrier 20 serve as input elements. Further, the sun gear 11 of the split portion 9 serves as a reaction force element and the ring gear 18 of the transmission portion 10 serves as an output element, and thus, the compound planetary gear mechanism is formed. That is, the compound planetary gear mechanism is configured such that the input shaft 16, an output shaft 6a of the first motor 6, and a driven gear 23 (described later) differentially rotate.

Further, a second clutch mechanism CL2 to unify the whole transmission portion 10 is provided. The second clutch mechanism CL2 is configured to connect at least any two rotating elements, e.g., the carrier 20 and the ring gear 18 or the sun gear 17 in the transmission portion 10, or the sun gear 17 and the ring gear 18. Similarly to the first clutch mechanism CL1, the second clutch mechanism CL2 is constituted by a meshing-type clutch mechanism configured to transmit a torque by engaging dog teeth. In the example illustrated in FIG. 1, the second clutch mechanism CL2 is configured to connect the carrier 20 to the ring gear 18 in the transmission portion 10. More specifically, a rotary disk 20a configured to rotate integrally with the carrier 20 is provided, and the second clutch mechanism CL2 is provided so as to engage the rotary disk 20a with the ring gear 18 of the transmission portion 10.

Note that the carrier 14 of the split portion 9 is one example of a "first rotating element." The sun gear 11 of the split portion 9 is one example of a "second rotating element." The ring gear 18 of the transmission portion 10 is one example of a "third rotating element." The rotating elements 11, 12, 14, 17, 18, 20 constituting the split portion 9 and the transmission portion 10 are examples of a "plurality of rotating elements." The first clutch mechanism CL1 is one example of a "first engagement mechanism." The second clutch mechanism CL2 is one example of a "second engagement mechanism."

The first clutch mechanism CL1 and the second clutch mechanism CL2 are placed on the same axis as the engine 5, the split portion 9, and the transmission portion 10 and placed on the opposite side from the split portion 9 across the transmission portion 10. Note that the clutch mechanisms CL1, CL2 may be placed in a state where the clutch mechanisms CL1, CL2 placed adjacently on an inner peripheral side and on an outer peripheral side in the radial direction, respectively, as illustrated in FIG. 1, or may be placed adjacently in the axis direction. In a case where the clutch mechanisms CL1, CL2 are placed adjacently in the radial direction as illustrated in FIG. 1, the axial length of the whole first driving device 2 can be shortened. Further, in a case where the clutch mechanisms CL1, CL2 are placed adjacently in the axis direction, restrictions on the outside diameters of the clutch mechanisms CL1, CL2 are reduced. Accordingly, in a case where a friction-type clutch mechanism is employed, the number of friction plates can be reduced.

A counter shaft 22 is placed in parallel to the rotation central axis of the engine 5, the split portion 9, or the transmission portion 10. A driven gear 23 meshing with the output gear 21 is attached to the counter shaft 22. Further, a drive gear 24 is attached to the counter shaft 22, and the drive gear 24 meshes with a ring gear 26 of a differential gear unit 25 that is a final reduction gear. Further, a drive gear 28 attached to a rotor shaft 27 of the second motor 7 meshes with the driven gear 23. Accordingly, a power or a torque output from the second motor 7 is added, at the driven gear 23, to a power or a torque output from the output gear 21. A power or torque combined as such is output from the differential gear unit 25 to right and left drive shafts 29, and the power or torque is transmitted to the front wheels 1R, 1L.

Further, the first driving device 2 is provided with a friction-type or meshing-type first braking mechanism B1 configured to selectively fix the output shaft 15 or the input shaft 16 so that a driving torque output from the first motor 6 can be transmitted to the front wheels 1R, 1L. That is, when the output shaft 15 or the input shaft 16 is fixed by the first braking mechanism B1, the carrier 14 of the split portion 9 or the carrier 20 of the transmission portion 10 can function as a reaction force element, and the sun gear 11 of the split portion 9 can function as an input element. Note that the first braking mechanism B1 should be able to generate a reaction force torque when the first motor 6 outputs a driving torque. The first braking mechanism B1 is not limited to the configuration to completely fix the output shaft 15 or the input shaft 16, provided that a requested reaction force torque can be applied to the output shaft 15 or the input shaft 16. Alternatively, a one-way clutch configured to prohibit the output shaft 15 or the input shaft 16 from rotating in a reverse direction from a rotation direction where the output shaft 15 or the input shaft 16 rotates at the time when the engine 5 is driven may be provided as the first braking mechanism B1.

The first clutch mechanism CL1 and the second clutch mechanism CL2 are each constituted by a so-called normal-stay type clutch mechanism. Note that the normal-stay type clutch mechanism is a clutch mechanism configured as follows. That is, when an engagement signal to change from a disengaged state to an engaged state is input, the clutch mechanism outputs a control amount corresponding to the engagement signal from an actuator so as to change from the disengaged state to the engaged state, and when a disengagement signal to change from the engaged state to the disengaged state is input, the clutch mechanism outputs a control amount corresponding to the disengagement signal from the actuator so as to change from the engaged state to the disengaged state. Further, in a case where no engagement signal and no disengagement signal are input in the engaged state, even if the output from the actuator is stopped, the clutch mechanism maintains the engaged state, and in a case where no engagement signal and no disengagement signal are input in the disengaged state, even if the output from the actuator is stopped, the clutch mechanism maintains the disengaged state. That is, when a control signal is input, the clutch mechanism is configured to change between the engaged state and the disengaged state, and in a case where no control signal is input, the clutch mechanism is configured to maintain a state (the engaged state or the disengaged state) just before the input of the control signal is stopped.

Figure 3:
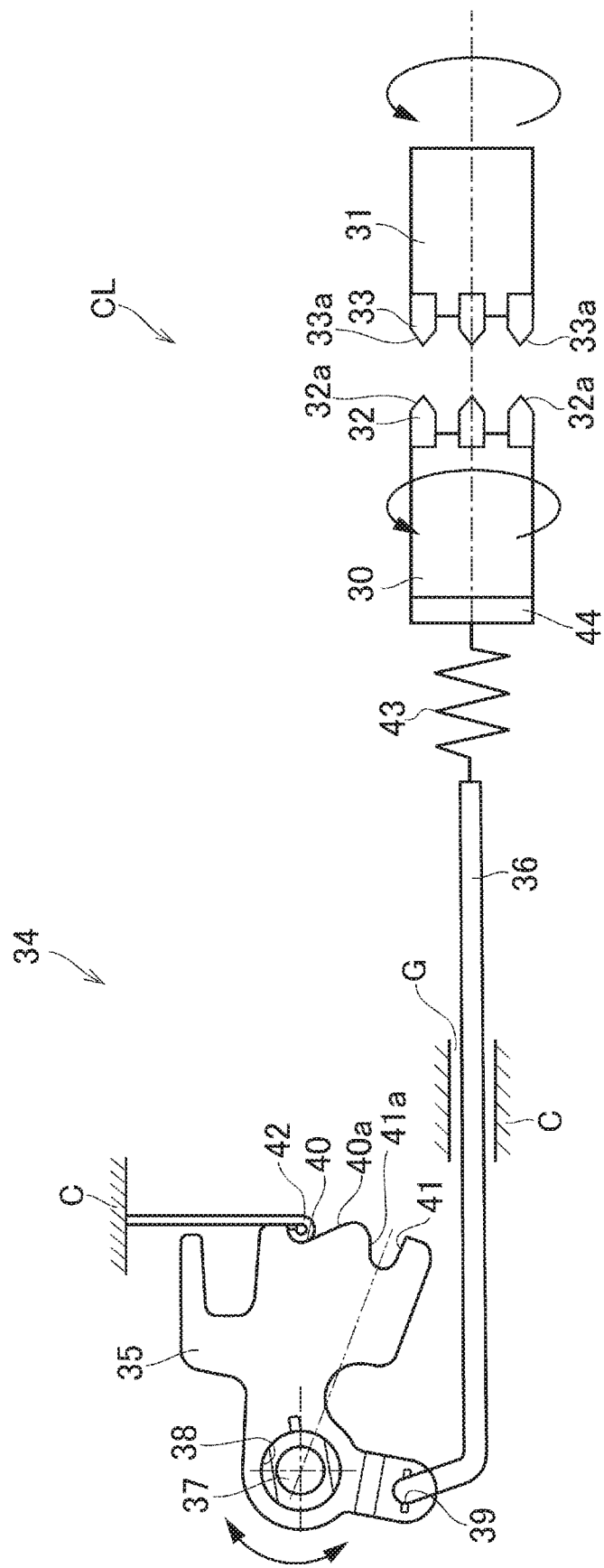
FIG. 3 is a schematic view to describe an exemplary configuration of a normal-stay type clutch mechanism.

One exemplary configuration of the normal-stay type clutch mechanism is schematically illustrated in FIG. 3. The first clutch mechanism CL1 and the second clutch mechanism CL2 can be configured like the configuration illustrated in FIG. 3. Accordingly, the following description deals with the exemplary configuration of the normal-stay type clutch mechanism without distinguishing the first clutch mechanism CL1 from the second clutch mechanism CL2. A clutch mechanism CL illustrated in FIG. 3 is constituted by a dog clutch configured such that two rotational members 30, 31 facing each other include respective dog teeth 32, 33 on their side faces such that the dog teeth 32, 33 each project toward the rotational member 31(30) side that the dog teeth 32, 33 face, and a torque is transmitted when the dog teeth 32, 33 mesh with each other. Note that, in a case where the clutch mechanism CL is employed for the first clutch mechanism CL1, one rotational member 30 (31) corresponds to the rotary disk 14a, and the other rotational member 31 (30) corresponds to the carrier 20. Further, in a case where the clutch mechanism CL is employed for the second clutch mechanism CL2, one rotational member 30 (31) corresponds to the rotary disk 20a, and the other rotational member 31 (30) corresponds to the ring gear 18.

An actuator 34 configured to apply, to one rotational member (hereinafter referred to as a first rotational member) 30 out of the rotational members 30, 31, a pressing force toward the other rotational member (hereinafter referred to as a second rotational member) 31 and a load to separate the first rotational member 30 from the second rotational member 31. In the example illustrated in FIG. 3, the actuator 34 is constituted by a motor (not shown), a plate 35 configured to rotate upon receipt of a torque transmitted from the motor, and a rod 36 configured to cause the first rotational member 30 to approach or separate from the second rotational member 31 when the plate 35 rotates.

The plate 35 illustrated in FIG. 3 has a through-hole 38 into which a shaft 37 for transmitting an output torque of the motor is inserted, a through-hole 39 formed at a position radially separated from the rotational central axis of the plate 35 by a predetermined distance and configured such that a first end of the rod 36 is inserted into the through-hole 39, and a first recessed portion 40 and a second recessed portion 41 formed at respective positions separated from the through-hole 39 in a rotation direction of the plate 35 so as to be recessed toward the rotational central axis.

The through-hole 38 has a key groove engaging with a key formed in the shaft 37, for example, so that the through-hole 38 rotates integrally with the shaft 37. Further, the through-hole 39 is formed so as to rotate relative to the first end of the rod 36, and a falling-off prevention portion (not shown) is formed in a distal end of the rod 36 inserted into the through-hole 39.

The first recessed portion 40 and the second recessed portion 41 restrain the rotation of the plate 35 by engaging with an engageable portion 42 formed in a fixed portion C of a case or the like. The first recessed portion 40 is formed at a position where the engageable portion 42 engages with the first recessed portion 40 when the first dog teeth 32 are most separated from the second dog teeth 33, and the second recessed portion 41 is formed at a position where the engageable portion 42 engages with the second recessed portion 41 when the first dog teeth 32 move to a position where the first dog teeth 32 mesh with the second dog teeth 33 so that a torque is transmitted. Note that side faces 40a, 41a of the first recessed portion 40 and the second recessed portion 41 in the rotation direction of the plate 35 are formed with an inclination angle at which the engageable portion 42 leaves the first recessed portion 40 or the second recessed portion 41 when a predetermined torque is input from the motor, and the engageable portion 42 does not leave the first recessed portion 40 or the second recessed portion 41 when disturbance such as vibration of the vehicle occurs. Further, the engageable portion 42 is configured to elastically deform along an inclined surface 40a, 41a when a relatively large torque is applied to the plate 35. That is, when a torque is input into the plate 35 from the motor, the engageable portion 42 receives a load from the inclined surface 40a, 41a in the radial direction of the plate 35, so that the engageable portion 42 elastically deforms along the inclined surface 40a, 41a.

Accordingly, when a torque corresponding to an engagement signal or a disengagement signal is input into the plate 35 from the motor, a connected state between the first recessed portion 40 and the engageable portion 42 is released so that the second recessed portion 41 engages with the engageable portion 42, or a connected state between the second recessed portion 41 and the engageable portion 42 is released so that the first recessed portion 40 engages with the engageable portion 42. In the meantime, in a case where no torque is input from the motor, e.g., a case where so-called disturbance such as vibration occurs, the connected state between the first recessed portion 40 and the engageable portion 42 or the connected state between the second recessed portion 41 and the engageable portion 42 is maintained.

In the example illustrated in FIG. 3, the first end of the rod 36 is formed so as to bend toward the plate 35 side (the upper side in FIG. 3), and further, a distal end of the first end is bent so as to be inserted into the through-hole 39 (toward the depth side in FIG. 3). Further, a central part of the rod 36 is held by a guide groove (or a guide slot) G formed in the case or the like so as to be movable in the axis direction of the rod 36, and a compression spring 43 is attached to a distal end of a second end of the rod 36. Further, the compression spring 43 is placed so as to abut with the first rotational member 30 via a thrust bearing 44. The thrust bearing 44 is provided so that the compression spring 43 and the first rotational member 30 rotate relative to each other. Note that the thrust bearing 44 is configured to transmit a load of the compression spring 43 to the first rotational member 30. That is, an axial force of the rod 36 based on the torque of the plate 35 can be transmitted to the first rotational member 30 via the compression spring 43 and the thrust bearing 44.

Further, the dog teeth 32, 33 are configured such that, in a case where the disengaged state is changed to the engaged state, more specifically, in a case where the dog teeth 32, 33 start to mesh with each other, even if respective phases (rotation angles) in the rotation direction of the dog teeth 32, 33 agree with each other and distal ends of the dog teeth 32, 33 make contact with each other, the dog teeth 32, 33 can engage with each other by shifting their phases. More specifically, an inclined surface 32a is formed in a distal end of the dog tooth (hereinafter referred to as a first dog tooth) 32 formed in the first rotational member 30 such that the inclined surface 32a is inclined from the rotation axis of the first rotational member 30. Further, more specifically, the distal end of the first dog tooth 32 is configured such that a central part of the distal end in a face-width direction projects in the axis direction. That is, the first dog tooth 32 is configured such that a face-width on the dedendum side is longer than a face-width on the addendum side. Similarly, an inclined surface 33a is formed in a distal end of the dog tooth (hereinafter referred to as a second dog tooth) 33 formed in the second rotational member 31 such that the inclined surface 33a is inclined from the rotation axis of the second rotational member 31. More specifically, the distal end of the second dog tooth 33 is configured such that a central part of the distal end in a face-width direction projects in the axis direction. That is, the second dog tooth 33 is configured such that a face-width on the dedendum side is longer than a face-width on the addendum side. Note that the first rotational member 30 is one example of an input-side rotational member, and the first dog tooth 32 is one example of a first meshing tooth. The second rotational member 31 is one example of an output-side rotational member, and the second dog tooth 33 is one example of a second meshing tooth.

Since the dog teeth 32, 33 are configured as such, when tooth tips (the inclined surfaces 32a, 33a) come into contact with each other, a component force to separate the dog tooth 33 (32) as a counterpart in the rotation direction is generated, so that the first rotational member 30 or the second rotational member 31 rotates relative to its counterpart, so that the phases of the dog teeth 32, 33 are shifted from each other. On this account, the dog teeth 32, 33 can mesh with each other without excessively adjusting (controlling) the phases of the rotational members 30, 31 in the rotation direction or a difference in rotation number between the rotational members 30, 31. Note that, in the example illustrated in FIG. 3, since the compression spring 43 is provided, it is possible to restrain a load from being excessively applied to the dog teeth 32, 33 when the tooth tips of the dog teeth 32, 33 come into contact with each other.

The second driving device 4 is configured to transmit, to the rear wheels 3R, 3L, a power or a torque of a rear motor 45 as one example of a "driving force source" in the embodiment of the disclosure. Note that the left rear wheel 3L is not illustrated for convenience. Similarly to the first motor 6 and the second motor 7, the rear motor 45 is constituted by a motor (that is, a motor generator: MGR) having a power generation function. A transmission mechanism 46 is connected to the rear motor 45. The transmission mechanism 46 is configured to selectively change between a reduction stage configured to amplify a torque of the rear motor 45 and a fixed stage configured to just output a torque of the rear motor 45 without changing the torque.

The transmission mechanism 46 illustrated in FIG. 2 is constituted by a single-pinion type planetary gear mechanism including a sun gear 47, a ring gear 48 that is an internal gear placed concentrically to the sun gear 47, a pinion gear 49 placed between the sun gear 47 and the ring gear 48 so as to mesh with the sun gear 47 and the ring gear 48, and a carrier 50 that holds the pinion gear 49 so that the pinion gear 49 can rotate and revolve.

The sun gear 47 of the transmission mechanism 46 is connected to the rear motor 45 and functions as an input element. The carrier 50 is connected to an output shaft 51 and functions as an output element. Further, a third clutch mechanism CL3 to cause the transmission mechanism 46 to function as the fixed stage is provided. The third clutch mechanism CL3 is configured to connect at least any two rotating elements, e.g., the sun gear 47 and the ring gear 48 or the carrier 50 in the transmission mechanism 46, or the ring gear 48 and the carrier 50. Similarly to the first clutch mechanism CL and the second clutch mechanism CL2, the third clutch mechanism CL3 is constituted by a meshing-type clutch mechanism configured to transmit a torque by engaging dog teeth. In the example illustrated in FIG. 2, the third clutch mechanism CL3 is configured to connect the ring gear 48 to the carrier 50 in the transmission mechanism 46. Accordingly, in the third clutch mechanism CL3, either one of the ring gear 48 and the carrier 50 corresponds to the first rotational member 30 in FIG. 3, and the other one of the ring gear 48 and the carrier 50 corresponds to the second rotational member 31 in FIG. 3.

Further, a second braking mechanism B2 to cause the transmission mechanism 46 to function as the reduction stage is provided. The second braking mechanism B2 is configured to selectively fix the ring gear 48 of the transmission mechanism 46, and similarly to the clutch mechanisms CL1, CL2, CL3, the second braking mechanism B2 is constituted by a meshing-type clutch mechanism configured to transmit a torque by engaging dog teeth. The second braking mechanism B2 illustrated in FIG. 2 is configured to fix the ring gear 48 by engaging, with the ring gear 48, a fixed portion C of a case or the like in which the second driving device 4 is accommodated. When the ring gear 48 is fixed by the second braking mechanism B2 as such, the ring gear 48 functions as a reaction force element. Note that, in the second braking mechanism B2, either one of the ring gear 48 and the fixed portion C corresponds to the first rotational member 30 in FIG. 3, and the other one of the ring gear 48 and the fixed portion C corresponds to the second rotational member 31 in FIG. 3.

Note that the sun gear 47 and the carrier 50 are an example of a "second pair of rotational members," and the ring gear 48 and the carrier 50 are an example of a "first pair of rotational members." The third clutch mechanism CL3 is one example of a "fourth engagement mechanism." The second braking mechanism B2 is one example of a "third engagement mechanism." When the second braking mechanism B2 is engaged, an amplification ratio of a torque transmitted from the rear motor 45 to the rear wheels 3R, 3L becomes larger than that in a case where the third clutch mechanism CL3 is engaged. Accordingly, in the above example, the second braking mechanism B2 is one example of a "meshing-type engagement mechanism."

A drive gear 52 is attached to an output shaft 51 of the transmission mechanism 46. A counter shaft 53 is placed in parallel to the output shaft 51, and a driven gear 54 meshing with the drive gear 52 is attached to a first end of the counter shaft 53. The driven gear 54 is formed so as to have a diameter larger than that of the drive gear 52, and the driven gear 54 is configured to amplify an output torque of the transmission mechanism 46. A drive gear 55 is attached to a second end of the counter shaft 53, and the drive gear 55 meshes with a ring gear 57 of a differential gear unit 56 that is a final reduction gear. A drive shaft 58 is connected to the differential gear unit 56, and a power output from the rear motor 45 is transmitted to the rear wheels 3R, 3L via the drive shaft 58.

A first power control device 59 including an inverter, a converter, and the like is connected to the first motor 6, a second power control device 60 including an inverter, a converter, and the like is connected to the second motor 7, a third power control device 61 including an inverter, a converter, and the like is connected to the rear motor 45, and the power control devices 59, 60, 61 are connected to a power storage device 62 constituted by a lithium ion battery, a capacitor, or the like. Further, the first power control device 59, the second power control device 60, and the third power control device 61 are configured to mutually supply an electric power to each other. More specifically, in a case where the first motor 6 outputs a reaction force torque so as to function as a generator, an electric power generated by the first motor 6 can be supplied to the second motor 7 and the rear motor 45 without passing through the power storage device 62.

Figure 4:
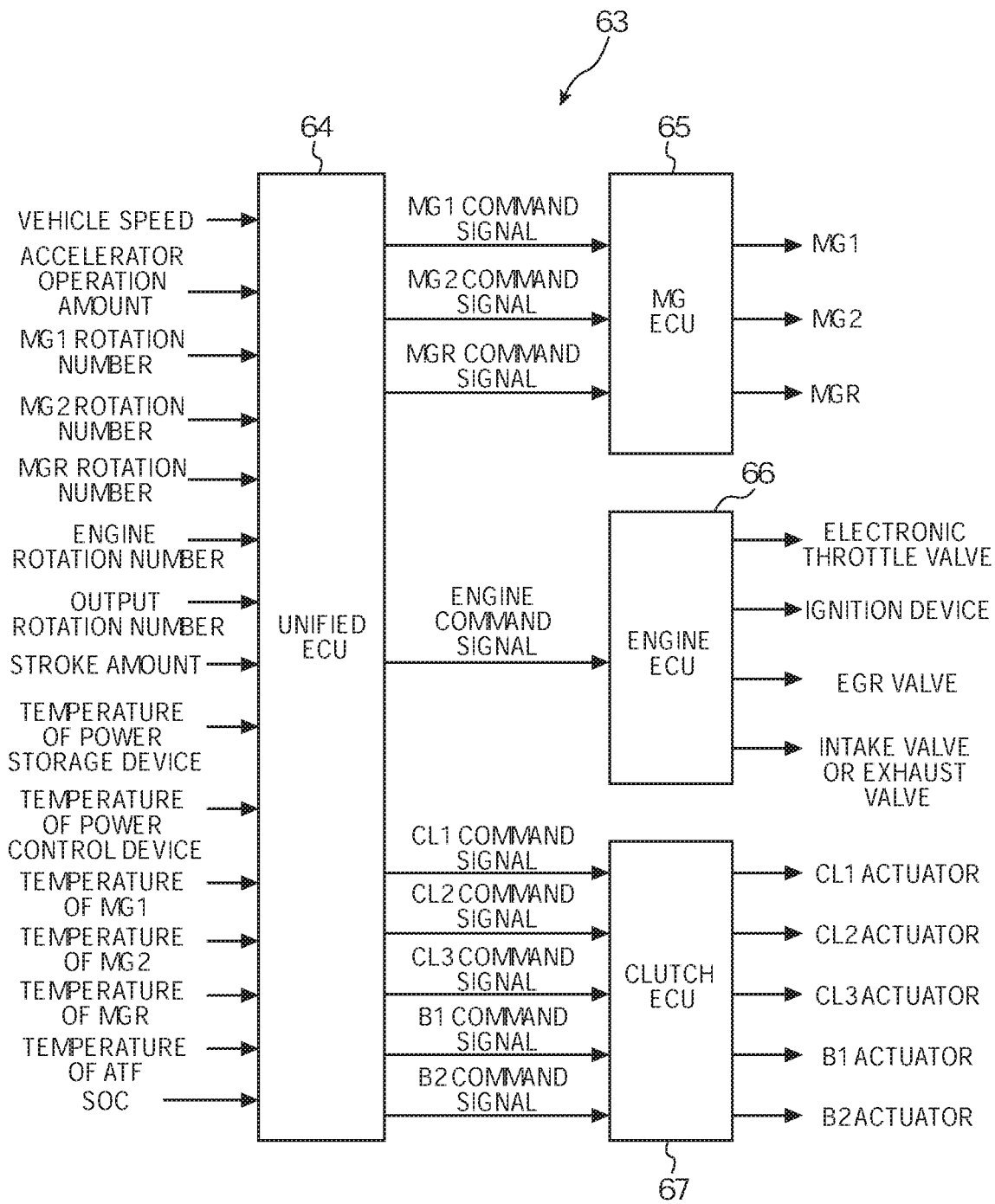
FIG. 4 is a block diagram to describe a configuration of an electronic control unit (ECU)

An electronic control unit (ECU) 63 for controlling the inverters and the converters of the power control devices 59, 60, 61, the engine 5, the clutch mechanisms CL1, CL2, CL3, and the braking mechanisms B1, B2 is provided. The ECU 63 is one example of a "controller" and is constituted mainly by a microcomputer. FIG. 4 is a block diagram to describe one example of a configuration of the ECU 63. In the example illustrated in FIG. 4, the ECU 63 is constituted by a unified ECU 64, an MG-ECU 65, an engine ECU 66, and a clutch ECU 67.

The unified ECU 64 is configured such that data are input into the unified ECU 64 from various sensors provided in the vehicle, and based on the data thus input and a map, a computing equation, or the like stored in advance, the unified ECU 64 outputs command signals to the MG-ECU 65, the engine ECU 66, and the clutch ECU 67. Examples of data input into the unified ECU 64 are illustrated in FIG. 4 and the following data are input into the unified ECU 64: a vehicle speed; an accelerator operation amount; a rotation number of the first motor (MG1) 6; a rotation number of the second motor (MG2) 7; a rotation number of the rear motor (MGR) 45; a rotation number (engine rotation number) of the output shaft 15 of the engine 5; an output rotation number as a rotation number of the ring gear 18 of the transmission portion 10 or the counter shaft 22; stroke amounts of rods provided in the clutch mechanisms CL1, CL2, CL3 and the second braking mechanism B2; a temperature of the power storage device 62; temperatures of the power control devices 59, 60, 61; a temperature of the first motor 6; a temperature of the second motor 7; a temperature of the rear motor 45; a temperature of oil (ATF) for lubricating the split portion 9, the transmission portion 10, the transmission mechanism 46, or the like; and a remaining charge amount (SOC) of the power storage device 62.

Based on the data and the like thus input into the unified ECU 64, the unified ECU 64 finds an operating state (an output torque and a rotation number) of the first motor 6, an operating state (an output torque and a rotation number) of the second motor 7, and an operating state (an output torque and a rotation number) of the rear motor 45, and outputs data thus found to the MG-ECU 65 as a command signal. Similarly, based on the data and the like thus input into the unified ECU 64, the unified ECU 64 finds an operating state (an output torque and a rotation number) of the engine 5 and outputs data thus found to the engine ECU 66 as a command signal. Further, based on the data and the like thus input into the unified ECU 64, the unified ECU 64 determines change information or the like to change between the engaged state and the disengaged state of each of the clutch mechanisms CL1, CL2, CL3 and the braking mechanisms B1, B2 and outputs data thus determined to the clutch ECU 67 as a command signal.

The MG-ECU 65 finds current values to be applied to the motors 6, 7, 45 based on the data thus input from the unified ECU 64, and outputs respective command signals to the motors 6, 7, 45. The motors 6, 7, 45 are alternating-current motors, so that each of the command signals includes a frequency of a current to be generated by the inverter, a voltage value to be boosted by the converter, and so on.

Based on the data input from the unified ECU 64, the engine ECU 66 finds a current value to determine an opening degree of an electronic throttle valve, a current value to ignite fuel by an ignition device, a current value to determine an opening degree of an exhaust gas recirculation (EGR) valve, a current value to determine opening degrees of an intake valve and an exhaust valve, and so on, and outputs respective command signals to those valves and devices. That is, a command signal to control an output (power) of the engine 5, an output torque of the engine 5, or an engine rotation number is output from the engine ECU 66.

The clutch ECU 67 finds current values to be applied to respective actuators for determining the engaged states and the disengaged states of the clutch mechanisms CL1, CL2, CL3 and the braking mechanisms B1, B2, based on the data input into the unified ECU 64, and outputs command signals to the respective actuators.

The first driving device 2 can set an HV running mode in which the vehicle runs by outputting a driving torque from the engine 5, and an EV running mode in which the vehicle runs by outputting a driving torque from the first motor 6 or the second motor 7 without outputting a driving torque from the engine 5. Further, as the HV running mode, an HV-Lo mode in which the rotation number of the engine 5 (or the input shaft 16) becomes higher than the rotation number of the ring gear 18 of the transmission portion 10 in a case where the first motor 6 is rotated at a low rotation number (including a rotation number of "0"), an HV-Hi mode in which the rotation number of the engine 5 (or the input shaft 16) becomes lower than the rotation number of the ring gear 18 of the transmission portion 10, and a direct-connection mode in which the rotation number of the ring gear 18 of the transmission portion 10 and the rotation number of the engine 5 (or the input shaft 16) are the same can be set.

Furthermore, as the EV running mode, a dual mode in which driving torques are output from the first motor 6 and the second motor 7, and a single mode in which a driving torque is output only from the second motor 7 without outputting a driving torque from the first motor 6 can be set. Further, as the dual mode, an EV-Lo mode in which the amplification ratio of a torque output from the first motor 6 is relatively large, and an EV-Hi mode in which the amplification ratio of a torque output from the first motor 6 is relatively small can be set. Note that, in the single mode, the vehicle can run by outputting a driving torque only from the second motor 7 in a state where the first clutch mechanism CL1 is engaged, the vehicle can run by outputting a driving torque only from the second motor 7 in a state where the second clutch mechanism CL2 is engaged, or the vehicle can run by outputting a driving torque only from the second motor 7 in a state where the clutch mechanisms CL1, CL2 are disengaged.

Those running modes are set by controlling the first clutch mechanism CL1, the second clutch mechanism CL2, the first braking mechanism B1, the engine 5, and the motors 6, 7. FIG. 5 illustrates, as a diagram, these running modes, and examples of respective engaged/disengaged states of the first clutch mechanism CL1, the second clutch mechanism CL2, and the first braking mechanism B1, operating states of the first motor 6 and the second motor 7, and whether a driving torque is output from the engine 5 or not, in each of the running modes. In the figure, the symbol "E" indicates an engaged state, the symbol "D" indicates a disengaged state, the symbol "G" indicates that a motor is mainly driven as a generator, the symbol "M" indicates that a motor is mainly driven as a motor, a blank indicates that a motor does not function as a motor and a generator or indicates a state where the first motor 6 and the second motor 7 do not operate for driving, "ON" indicates a state where a driving torque is output from the engine 5, and "OFF" indicates a state where a driving torque is not output from the engine 5.

Collinear diagrams to describe respective rotation numbers of the rotating elements of the power split device 8 when each of the running modes is set, and directions of torques of the engine 5 and the motors 6, 7 are illustrated in FIGS. 6 to 11. The collinear diagram is a diagram in which straight lines indicative of respective rotating elements in the power split device 8 are drawn in parallel to each other with a distance corresponding to a gear ratio, and distances from a base line perpendicular to those straight lines are shown as respective rotation numbers of the rotating elements. In each of the straight lines indicative of the respective rotating elements, the direction of a torque is indicated by an arrow and the magnitude of the torque is indicated by the length of the arrow.

Figure 6:
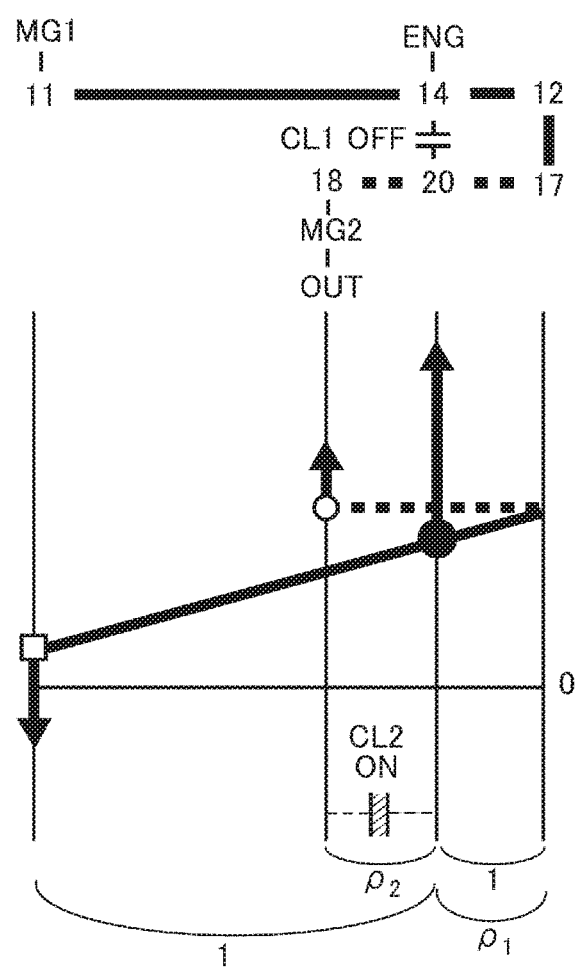
FIG. 6 is a collinear diagram to describe an operation state in an HV-Hi mode.
Figure 7:
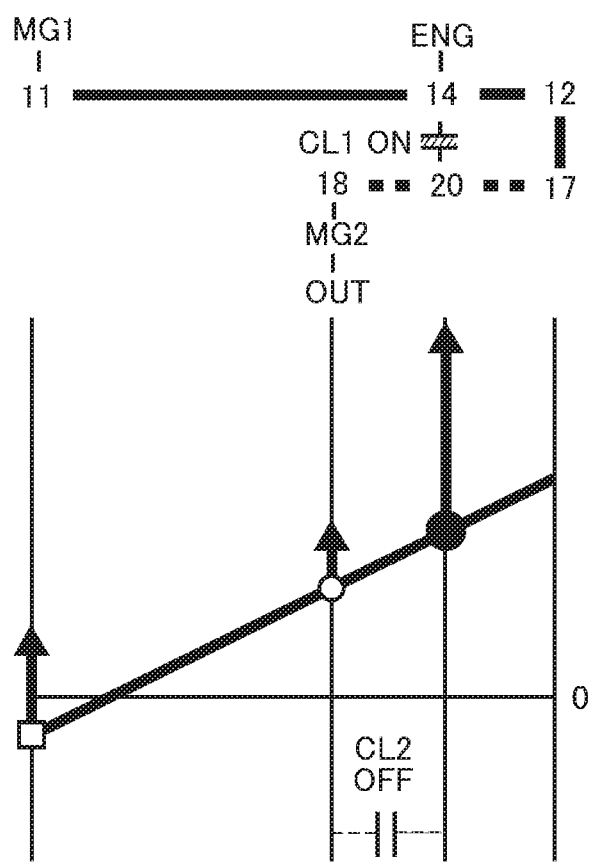
FIG. 7 is a collinear diagram to describe an operation state in an HV-Lo mode.

As illustrated in FIG. 6, in the HV-Hi mode, a driving torque is output from the engine 5, the second clutch mechanism CL2 is engaged, and a reaction force torque is output from the first motor 6. Further, as illustrated in FIG. 7, in the HV-Lo mode, a driving torque is output from the engine 5, the first clutch mechanism CL1 is engaged, and a reaction force torque is output from the first motor 6. In a case where the HV-Hi mode or the HV-Lo mode is set, the rotation number of the first motor 6 is controlled so as to achieve best efficiency (a value obtained by dividing an amount of consumed energy by an energy amount of the front wheels 1R, 1L) as the whole first driving device 2 in consideration of fuel efficiency of the engine 5, driving efficiency of the first motor 6, and so on. The rotation number of the first motor 6 can be changed continuously, and the engine rotation number is determined based on the rotation number of the first motor 6 and the vehicle speed. Accordingly, the power split device 8 can function as a continuously variable transmission.

As described above, in a case where the first motor 6 outputs a reaction force torque so as to function as a generator, a part of a power of the engine 5 is converted into electrical energy by the first motor 6. A power obtained by removing, from the power of the engine 5, the power thus converted into the electrical energy by the first motor 6 is transmitted to the ring gear 18 of the transmission portion 10. A reaction force torque output from the first motor 6 is determined according to a split ratio of a torque transmitted to the first motor 6 side from the engine 5 via the power split device 8. A ratio between the torque transmitted to the first motor 6 side from the engine 5 via the power split device 8 and a torque transmitted to the ring gear 18 side, that is, the split ratio of torque in the power split device 8 is different between the HV-Lo mode and the HV-Hi mode.

More specifically, in a case where the torque transmitted to the first motor 6 side is assumed "1," the ratio of the torque transmitted to the ring gear 18 side is "1/($\mu 1 \times \rho 2$)" in the HV-Lo mode, and the ratio is "1/$\rho 1$" in the HV-Hi mode. That is, the ratio of the torque transmitted to the ring gear 18 side out of a torque output from the engine 5 is "1/(1−($\rho 1 \times \rho 2$))" in the HV-Lo mode, and the ratio is "1/($\rho 1+1$)" in the HV-Hi mode. Here, "$\rho 1$" is a gear ratio of the split portion 9 (a ratio between the number of teeth of the ring gear 12 and the number of teeth of the sun gear 11), and "$\rho 2$" is a gear ratio of the transmission portion 10 (a ratio between the number of teeth of the ring gear 18 and the number of teeth of the sun gear 17). Note that $\rho 1$ and $\rho 2$ are set to a value smaller than "1." Accordingly, in a case where the HV-Lo mode is set, the ratio of the torque transmitted to the ring gear 18 is larger than that in a case where the HV-Hi mode is set. The ratio of "1/(1−($\rho 1 \times \rho 2$))" that is the ratio of the torque transmitted to the ring gear 18 out of the torque output from the engine 5 in a case where the HV-Lo mode is set corresponds to a "first split ratio" in the embodiment of the disclosure, and the ratio of "1/($\rho 1+1$)" that is the ratio of the torque transmitted to the ring gear 18 out of the torque output from the engine 5 in a case where the HV-Hi mode is set corresponds to a "second split ratio" in the embodiment of the disclosure. Note that, in a case where the rotation number of the engine 5 is increased by a torque generated by the engine 5, a torque obtained by subtracting a torque necessary to increase the rotation number of the engine 5 from the torque generated by the engine 5 is the torque output from the engine 5.

Then, an electric power generated by the first motor 6 is supplied to the second motor 7. In this case, an electric power charged in the power storage device 62 is also supplied to the second motor 7 as necessary. Note that the second motor 7 and the rear motor 45 function to further add a driving torque to a driving torque transmitted from the engine 5. In terms of control of a driving force as the whole vehicle, the second motor 7 and the rear motor 45 can be considered to be the same. Accordingly, an electric power may be supplied to the rear motor 45 instead of the second motor 7 or in addition to the second motor 7. The following description is made with an example in which a driving torque to be added is output only from the second motor 7.

Figure 8:
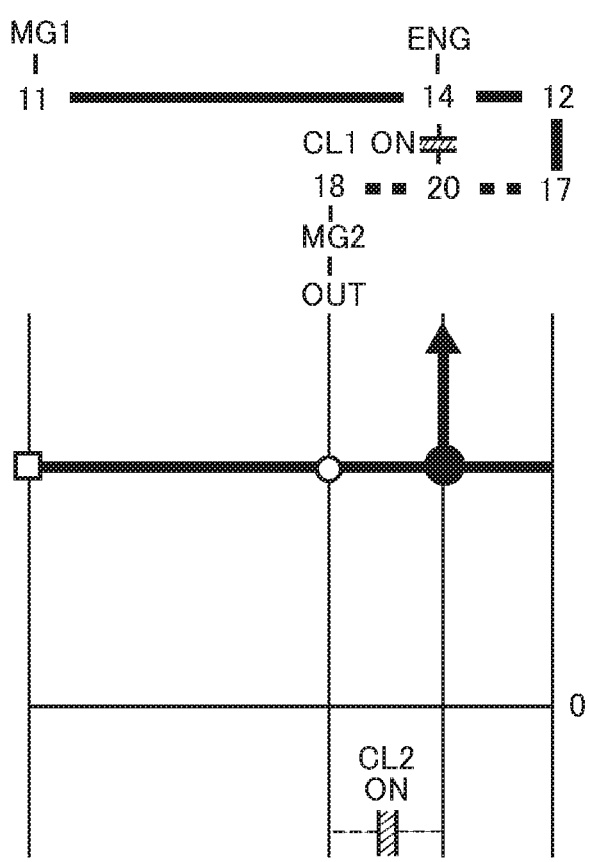
FIG. 8 is a collinear diagram to describe an operation state in a direct-connection mode.

In the direct-connection mode, when the clutch mechanisms CL1, CL2 are engaged, the rotating elements of the power split device 8 rotate at the same rotation number as illustrated in FIG. 8. That is, all the power of the engine 5 is output from the power split device 8. In other words, a part of the power of the engine 5 is not converted into electrical energy by the first motor 6 or the second motor 7. Accordingly, a loss caused due to an electric resistance or the like generated when the power is converted into electrical energy is not caused, so that transmission efficiency of the power can be improved.

Figure 9:
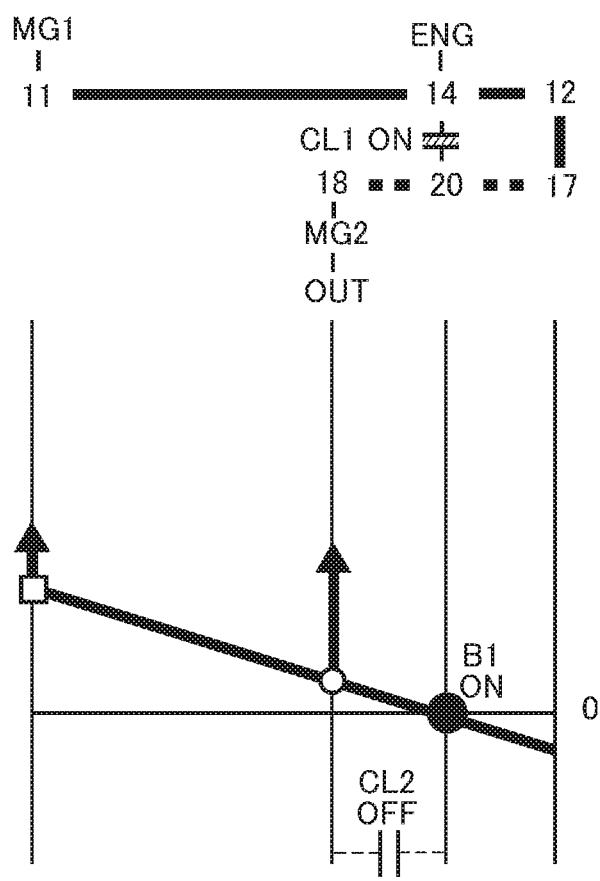
FIG. 9 is a collinear diagram to describe an operation state in an EV-Lo mode.
Figure 10:
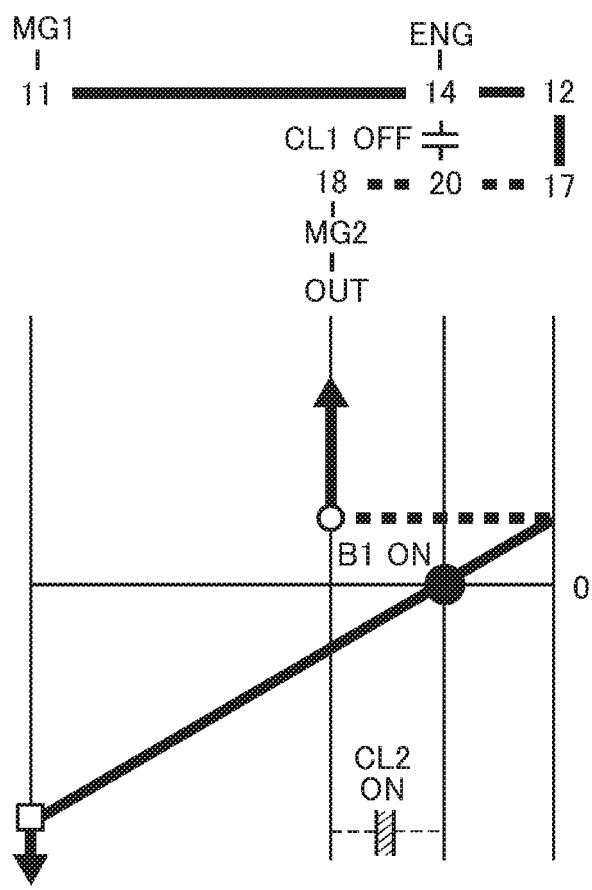
FIG. 10 is a collinear diagram to describe an operation state in an EV-Hi mode.
Figure 11:
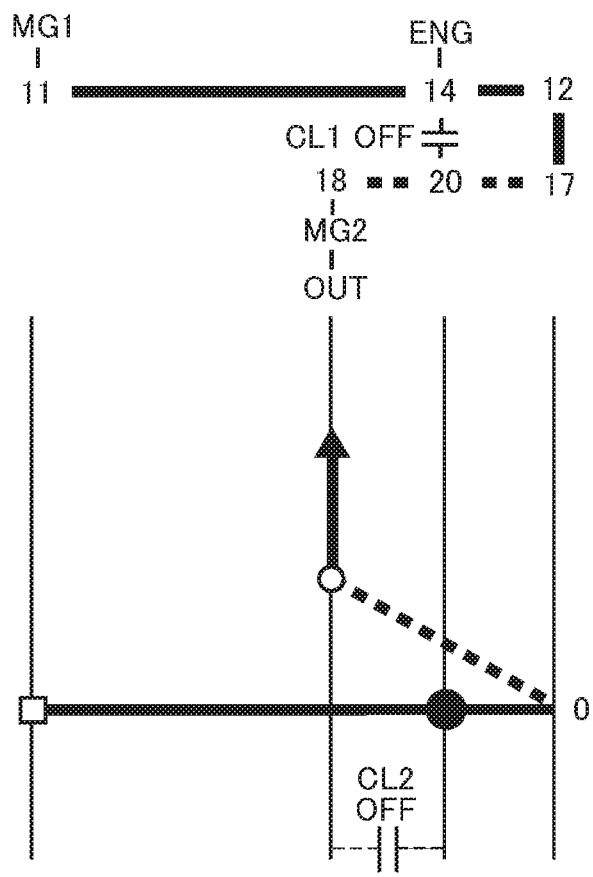
FIG. 11 is a collinear diagram to describe an operation state in a single mode.

Further, as illustrated in FIGS. 9 and 10, in the EV-Lo mode and the EV-Hi mode, the vehicle runs by engaging the first braking mechanism B1 and by outputting driving torques from the motors 6, 7. As illustrated in FIGS. 9 and 10, a rotation number ratio of the rotation number of the ring gear 18 of the transmission portion 10 with respect to the rotation number of the first motor 6 is smaller in the EV-Lo mode than in the EV-Hi mode. That is, a speed reduction ratio is larger in the EV-Lo mode than in the EV-Hi mode. On this account, by setting the EV-Lo mode, a larger driving force can be obtained. Note that, as illustrated in FIG. 11, in the single mode, a driving torque is output only from the second motor 7 and the clutch mechanisms CL1, CL2 are disengaged, so that the rotating elements of the power split device 8 are stopped. Accordingly, a power loss caused by dragging and rotating the engine 5 and the first motor 6 can be reduced.

The running mode is determined based on the remaining charge amount (SOC) of the power storage device 62, the vehicle speed, the requested driving force, and so on. In the present embodiment, a charge sustain (CS) mode to set the running mode so as to maintain the remaining charge amount of the power storage device 62, or a charge depleting (CD) mode to actively use an electric power charged in the power storage device 62 is selected in accordance with the remaining charge amount of the power storage device 62. More specifically, in a case where the remaining charge amount of the power storage device 62 is decreased, the CS mode is selected, and in a case where the remaining charge amount of the power storage device 62 is relatively large, the CD mode is selected.

Figure 12:
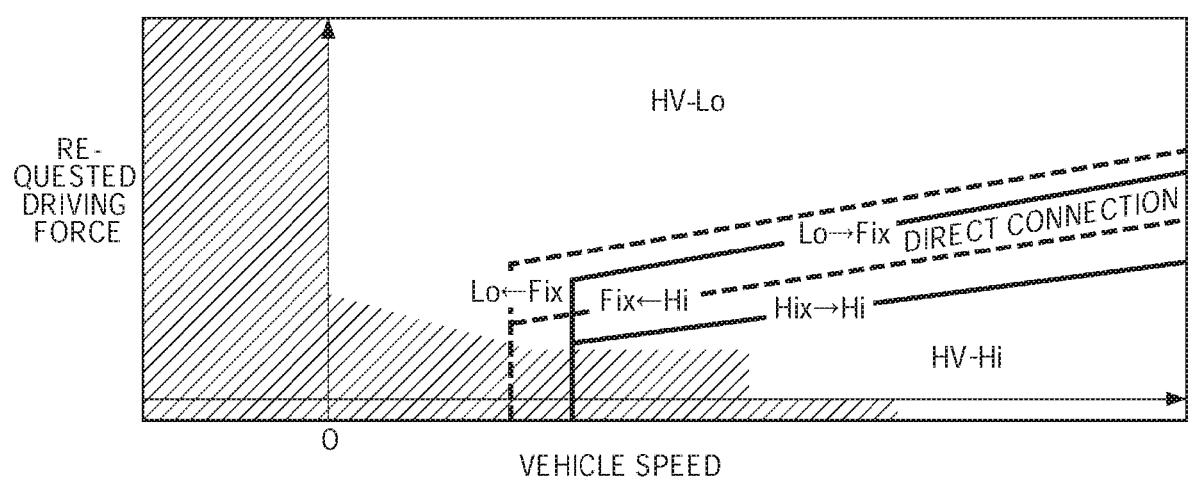
FIG. 12 is a view illustrating one example of a map for determining a running mode when a CS mode is selected.

FIG. 12 illustrates one example of a map for determining the running mode when the CS mode is selected. In this map, the horizontal axis indicates a vehicle speed, and the vertical axis indicates a requested driving force. Note that the vehicle speed can be found from data detected by a vehicle speed sensor, and the requested driving force can be found from data detected by an accelerator operation amount sensor.

In the example illustrated in FIG. 12, in a case where the vehicle reverses, the single mode is set regardless of the magnitude of the requested driving force, and in a case where the vehicle moves forward and the requested driving force is relatively small (including a deceleration request), the single mode is set. Note that hatching is given to a region where the single mode is set.

Further, in a case where the vehicle moves forward and the requested driving force is relatively large, the HV running mode is set. Note that, in the HV running mode, the driving force can be output from a low vehicle speed area to a high vehicle speed area. Accordingly, in a case where the remaining charge amount of the power storage device 62 is close to a lower limit, the HV running mode may be set even in a region where the single mode should be set.

Further, in a case where the HV running mode is set, any of the HV-Lo mode, the HV-Hi mode, and the direct-connection mode is selected in accordance with the vehicle speed and the requested driving force. More specifically, in a case where the vehicle speed is relatively low or the requested driving force is relatively large, the HV-Lo mode is selected, in a case where the vehicle speed is relatively high and the requested driving force is relatively small, the HV-Hi mode is selected, and in a case where the operating state of the vehicle is at an operating point (a value based on the vehicle speed and the requested driving force) between a region where the HV-Lo mode is set and a region where the HV-Hi mode is set, the direct-connection mode is selected.

Further, the HV-Lo mode, the direct-connection mode, and the HV-Hi mode are changed from one to another when the operating point crosses a corresponding line illustrated in FIG. 12. More specifically, in a case where the operating point crosses a line of "Lo←Fix" in FIG. 12 from right to left or in a case where the operating point crosses the line from down to up, the direct-connection mode is changed to the HV-Lo mode. In the meantime, in a case where the operating point crosses a line of "Lo→Fix" from left to right or in a case where the operating point crosses the line from up to down, the HV-Lo mode is changed to the direct-connection mode. Similarly, in a case where the operating point crosses a line of "Fix←Hi" in FIG. 12 from right to left or in a case where the operating point crosses the line from down to up, the HV-Hi mode is changed to the direct-connection mode. In the meantime, in a case where the operating point crosses a line of "Fix→Hi" from left to right or in a case where the operating point crosses the line from up to down, the direct-connection mode is changed to the HV-Hi mode.

Figure 13:
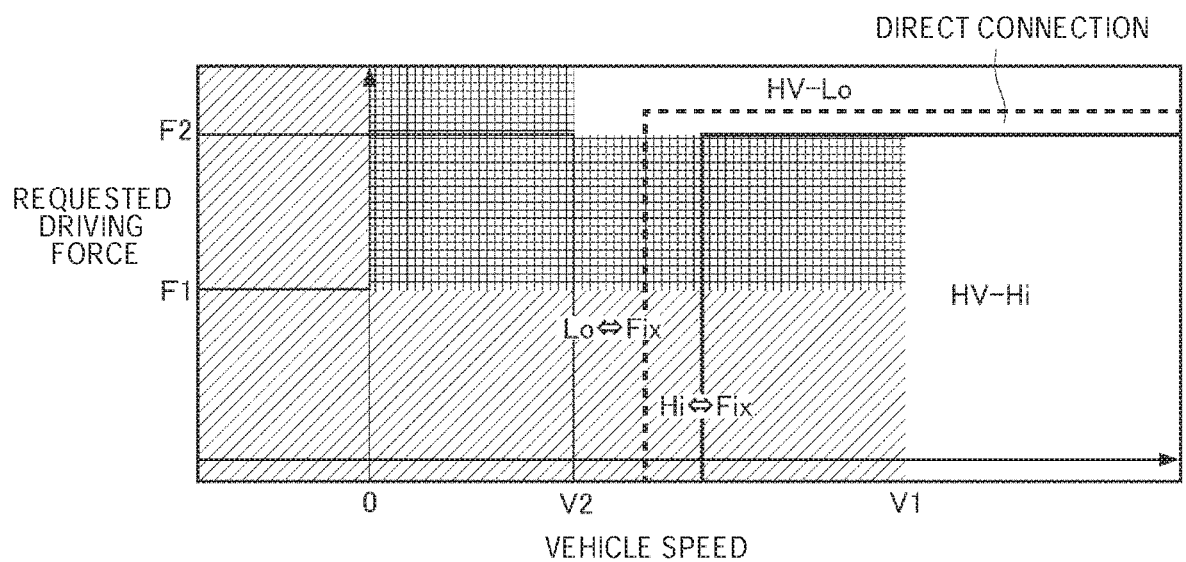
FIG. 13 is a view illustrating one example of a map for determining a running mode when a CD mode is selected.

FIG. 13 illustrates one example of a map for determining the running mode when the CD mode is selected. In this map, the horizontal axis indicates a vehicle speed, and the vertical axis indicates a requested driving force. Note that the vehicle speed can be found from data detected by the vehicle speed sensor, and the requested driving force can be found from data detected by the accelerator operation amount sensor.

In the example illustrated in FIG. 13, in a case where the vehicle reverses, the single mode is set regardless of the magnitude of the requested driving force, and in a case where the vehicle moves forward and the requested driving force is smaller than a first driving force F1 (including a deceleration request), the single mode is set. Note that hatching is given to a region where the single mode is set.

Further, in a case where the vehicle moves forward and the requested driving force is larger than the first driving force F1, the dual mode is set. Note that, within a region where the dual mode is set, the EV-Hi mode or the EV-Lo mode is selected appropriately in accordance with the efficiency of the motors 6, 7, and the like. Further, in a case where the vehicle speed is higher than a first vehicle speed V1 or in a case where the vehicle speed is higher than a second vehicle speed V2 and the requested driving force is larger than a second driving force F2, the HV running mode is set. Note that, in the HV running mode, the driving force can be output from a low vehicle speed area to a high vehicle speed area, and in a case where the remaining charge amount of the power storage device 62 is close to a lower limit, the HV running mode may be set even in a region where the single mode or the dual mode should be set.

Further, in a case where the HV running mode is set, any running mode selected from the HV-Lo mode, the HV-Hi mode, and the direct-connection mode is selected in accordance with the vehicle speed and the requested driving force. More specifically, in a case where the vehicle speed is relatively low or in a case where the requested driving force is relatively large, the HV-Lo mode is selected, in a case where the vehicle speed is relatively high and the requested driving force is relatively small, the HV-Hi mode is selected, and in a case where the operating state of the vehicle is at an operating point (a value based on the vehicle speed and the requested driving force) between a region where the HV-Lo mode is set and a region where the HV-Hi mode is set, the direct-connection mode is selected.

Further, the HV-Lo mode, the direct-connection mode, and the HV-Hi mode are changed from one to another when the operating point crosses respective lines illustrated in FIG. 13. More specifically, in a case where the operating point crosses a line of "Lo↔Fix" in FIG. 13, the running mode is changed between the direct-connection mode and the HV-Lo mode. Similarly, in a case where the operating point crosses a line of "Fix↔Hi" in FIG. 13, the running mode is changed between the HV-Hi mode and the direct-connection mode.

Note that, in FIGS. 12 and 13, the regions where respective running modes are set and the lines to change the mode under the condition where the HV running mode is set may change in accordance with temperatures of members constituting the first driving device 2, temperatures of the power storage device 62 or the power control devices 59, 60, 61, the remaining charge amount of the power storage device 62, and the like. Further, in order to restrain a decrease of the durability of the first motor 6 and the pinion gears 13, 19, the running mode may be changed based on conditions or the like different from the maps illustrated in FIGS. 12 and 13.

In a case where the vehicle runs by setting the single mode (hereinafter referred to as a separation mode) in which the clutch mechanisms CL1, CL2 are disengaged, when an accelerator pedal is stepped and a relatively large driving force is requested, for example, the first driving device 2 configured as described above may change the running mode to the dual mode or the HV running mode so as to satisfy the requested driving force. Alternatively, when the remaining charge amount of the power storage device 62 is decreased, the first driving device 2 may change the running mode to the HV running mode. That is, in a case where the vehicle runs by setting the single mode, it is predicted that the first clutch mechanism CL1 and the second clutch mechanism CL2 are changed from the disengaged state to the engaged state.

Further, in a case where the vehicle runs in a running mode where the first clutch mechanism CL1 and the second clutch mechanism CL2 are engaged, there is such a possibility that an operation amount of the accelerator pedal decreases, for example, so that the vehicle temporarily enters a running state where the single mode should be set, and after that, the operation amount of the accelerator pedal increases, so that the single mode is changed again to the running mode where the first clutch mechanism CL1 and the second clutch mechanism CL2 are engaged. That is, even in a case where the vehicle runs in the running mode where the first clutch mechanism CL and the second clutch mechanism CL2 are engaged, it is predicted that the first clutch mechanism CL1 and the second clutch mechanism CL2 are changed from the engaged state to the disengaged state in accordance with a running environment or the like and the disengaged state is changed to the engaged state again.

Since the engine 5 can be stopped in the separation mode, a sound pressure level inside the vehicle cabin is decreased. Particularly, in a case where the vehicle runs at a low speed, the sound pressure level inside the vehicle cabin is decreased because road noise is small. In the meantime, in an engagement mechanism in which the engaged state is established by engaging dog teeth, like the first clutch mechanism CL1 and the second clutch mechanism CL2, when the disengaged state is changed to the engaged state, engagement noise caused due to contact between the dog teeth occurs inevitably. Accordingly, when the running mode is changed to the dual mode or the HV running mode in a state where the sound pressure level inside the vehicle cabin is small, like the case where the vehicle runs in the separation mode as mentioned earlier, an occupant can hear the engagement noise conspicuously, so that the occupant may have an uncomfortable feeling.

On this account, a drive control device in the embodiment of the disclosure is configured to prohibit a meshing-type engagement mechanism (including the first clutch mechanism CL1 and the second clutch mechanism CL2) from entering the disengaged state in a case where the sound pressure level inside the vehicle cabin is small under a state where it is predicted that the meshing-type engagement mechanism is changed from the disengaged state to the engaged state. In other words, the drive control device is configured to engage the meshing-type engagement mechanism before the sound pressure level inside the vehicle cabin is decreased. One example of such a control is illustrated in FIG. 14.

Figure 14:
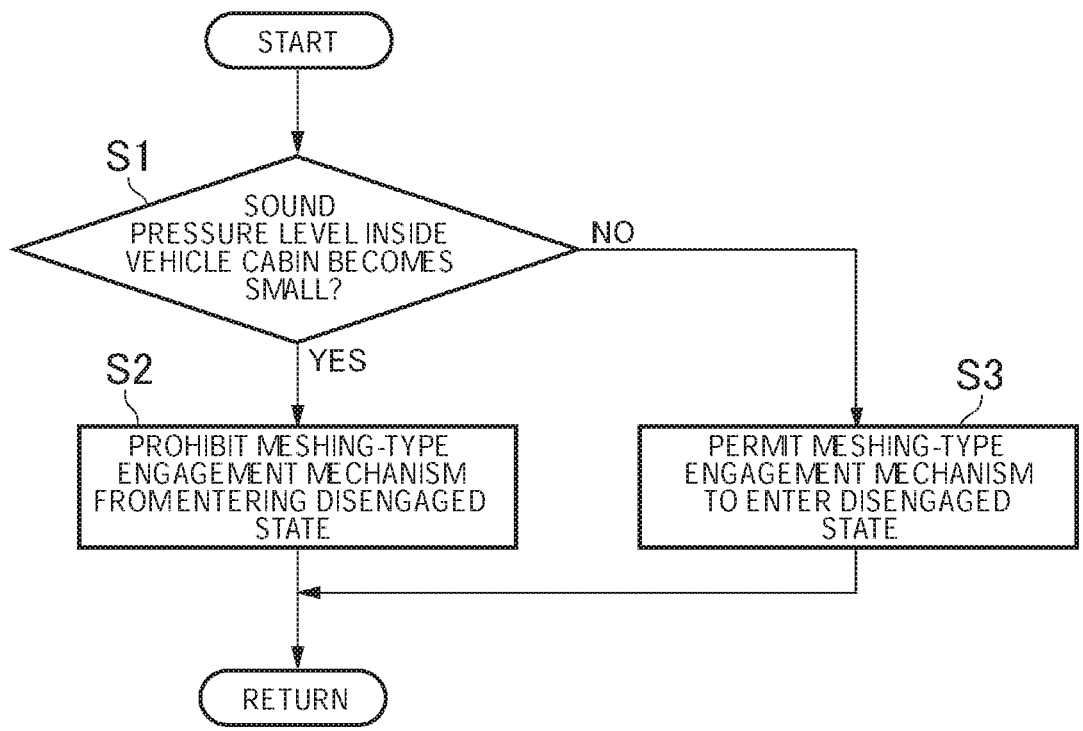
FIG. 14 is a flowchart to describe a control example of a drive control device in an embodiment of the disclosure.

In the example illustrated in FIG. 14, it is first determined whether or not the sound pressure level inside the vehicle cabin becomes small (step S1). More specifically, it is determined whether or not the sound pressure level inside the vehicle cabin decreases to a sound pressure level (hereinafter referred to as a lower-limit sound pressure level) at which the occupant has an uncomfortable feeling in a case where engagement noise along with engagement of the meshing-type engagement mechanism occurs. Examples of a parameter that contributes to the sound pressure level inside the vehicle cabin include road noise along with the vehicle speed, engine sound, sound along with the air flow of an air conditioner, volume of acoustic equipment, and the like. Accordingly, examples of the state where the sound pressure level inside the vehicle cabin is small include a state where the vehicle speed is low, a state where the engine 5 is stopped, a state where the air flow of the air conditioner is small, a state where the volume of the acoustic equipment is small, and the like. On this account, in a case where the vehicle speed decreases to be close to a lower-limit vehicle speed at which the sound pressure level inside the vehicle cabin reaches the lower-limit sound pressure level, when the vehicle speed is decreasing, when a condition to stop the engine 5 is established, when the air flow of the air conditioner is being decreased, or when the volume of the acoustic equipment is being decreased, an affirmative determination is made in step S1. In other words, in step S1, it is determined whether the sound pressure level inside the vehicle cabin may decrease to the lower-limit sound pressure level or not. Note that step S1 may be performed such that the sound pressure level inside the vehicle cabin is detected and it is determined whether the sound pressure level decreases or not.

In a case where the sound pressure level inside the vehicle cabin becomes small and an affirmative determination is made in step S1, the meshing-type engagement mechanism is prohibited from entering the disengaged state (step S2), and the process returns. That is, in a case where the separation mode is set, at least either one of the first clutch mechanism CL and the second clutch mechanism CL2 is engaged, and in a case where the dual mode or the HV running mode is set, the engagement mechanism thus engaged is prohibited from being changed to the disengaged state. Note that, in a case where the direct-connection mode is set, one of the engagement mechanisms is not prohibited from being disengaged. That is, in step S2, a state where a torque can be transmitted between the engine 5 and the front wheels 1R, 1L or a state where a torque can be transmitted between the first motor 6 and the front wheels 1R, 1L is established, or this state is maintained.

In contrast, in a case where the sound pressure level inside the vehicle cabin does not become small and a negative determination is made in step S1, the meshing-type engagement mechanism is permitted to enter the disengaged state (step S3), and the process returns. That is, in a case where the separation mode is set, the running mode is permitted to be changed to the dual mode or the HV running mode or the separation mode is permitted to be maintained, and in a case where the dual mode or the HV running mode is set, the running mode is permitted to be changed to the separation mode. That is, the running mode is permitted to be changed in accordance with the map illustrated in FIG. 12 or 13.

In a case where the sound pressure level becomes small, the meshing-type engagement mechanism is prohibited from entering the disengaged state. Hereby, it is possible to restrain the meshing-type engagement mechanism from being changed from the disengaged state to the engaged state in a state where the sound pressure level inside the vehicle cabin is the lower-limit sound pressure level or less. In other words, it is possible to engage the meshing-type engagement mechanism before the sound pressure level inside the vehicle cabin reaches the lower-limit sound pressure level or less. As a result, the meshing-type engagement mechanism is engaged in a state where the sound pressure level inside the vehicle cabin is relatively large. Accordingly, even if engagement noise occurs at the time when the meshing-type engagement mechanism is engaged, it is possible to restrain the occupant from having an uncomfortable feeling. Further, in a case where an accelerating request that cannot be satisfied by the single mode is received in a state where the sound pressure level inside the vehicle cabin is the lower-limit sound pressure level or less, the dual mode can be set only by engaging the first braking mechanism B1, and the HV running mode can be set by controlling the rotation number of the first motor 6 and cranking the engine 5. This makes it possible to improve acceleration response.

Further, in the configuration where the second motor 7 is connected to the driving wheels (the front wheels 1R, 1L) like the first driving device 2, the vehicle can run by the driving torque from the second motor 7 in a state where the engine 5 is stopped, so that the occurrence frequency of the state where the sound pressure level inside the vehicle cabin becomes the lower-limit sound pressure level or less is high. On this account, some embodiments may employ the drive control device of the present embodiment as a drive control device for the vehicle that can run in a state where the second motor 7 is connected to the driving wheels and the engine 5 is stopped.

Further, in a case where the ratio of the torque transmitted from the engine 5 to the driving wheels (the front wheels 1R, 1L) can be changed like the first driving device 2, the engagement mechanism (the first clutch mechanism CL1, in the above example) in which the ratio of the torque transmitted from the engine 5 to the driving wheels is relatively large is engaged before the sound pressure level inside the vehicle cabin reaches the lower-limit sound pressure level or less, thereby making it possible to improve acceleration response in comparison with a case where the engagement mechanism (the second clutch mechanism CL2, in the above example) in which the ratio of the torque transmitted from the engine 5 to the driving wheels is relatively small is engaged.

Similarly, when the engagement mechanism (the first clutch mechanism CL1, in the example) in which the transmission ratio between the first motor 6 and the driving wheels (the front wheels 1R, 1L) is relatively large is engaged before the sound pressure level inside the vehicle cabin reaches the lower-limit sound pressure level or less, it is possible to improve acceleration response in comparison with a case where the engagement mechanism (the second clutch mechanism CL2, in the above example) in which the transmission ratio is relatively small is engaged.

Furthermore, in the first driving device 2, the ratio of a power converted into an electric power by the first motor 6 is smaller in the HV-Lo mode than in the HV-Hi mode. In other words, the ratio of a torque of a power mechanically transmitted is larger in the HV-Lo mode than in the HV-Hi mode. On this account, by setting the HV-Lo mode, a loss (mainly a Joule loss) caused by converting the power into the electric power can be reduced, thereby making it possible to reduce an amount of consumed energy.

Further, in a case where the meshing-type engagement mechanism to be set to the engaged state is a normal-stay type clutch mechanism, even if a power supply of the vehicle is turned off (Ready OFF), the clutch mechanism can be maintained in the engaged state. On this account, even if a relatively large driving force is requested right after the power supply of the vehicle is turned on (Ready ON) after that, the dual mode can be set only by engaging the first braking mechanism B1, or the HV running mode can be set only by controlling the rotation number of the first motor 6 and cranking the engine 5, thereby making it possible to improve acceleration response.

Figure 15:
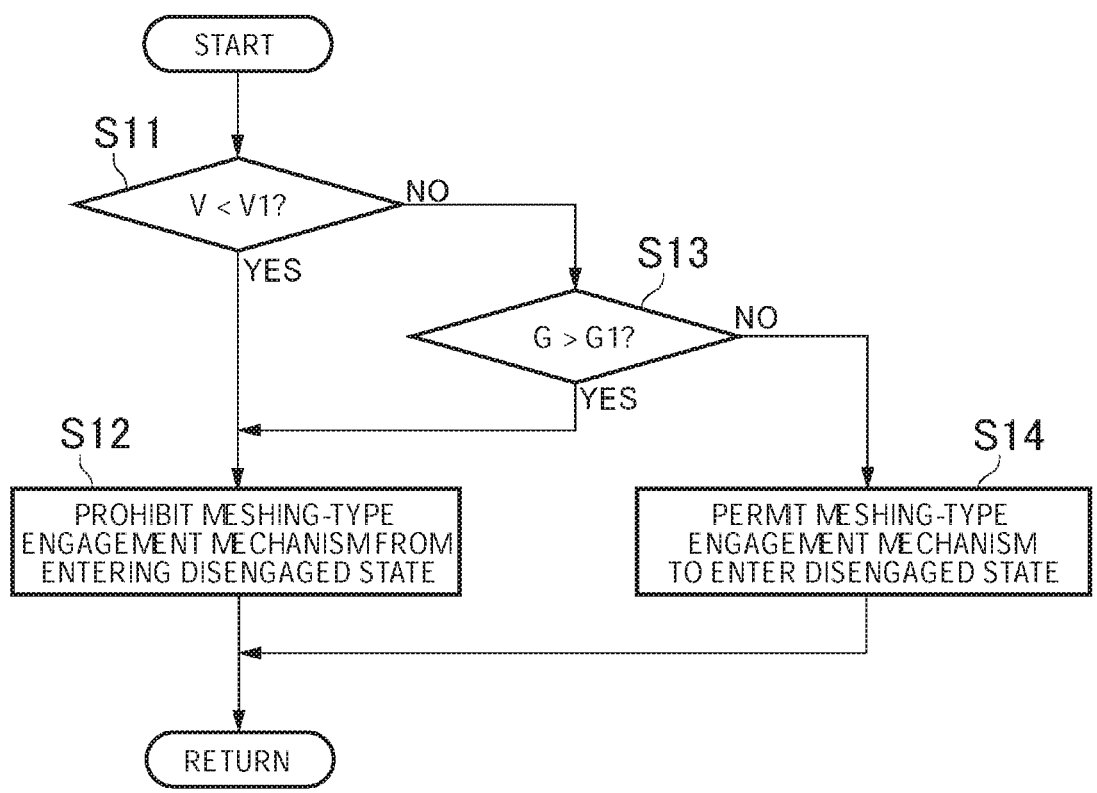
FIG. 15 is a flowchart to describe a control example to determine, based on a vehicle speed, whether or not an engagement mechanism is prohibited from entering a disengaged state.

FIG. 15 illustrates a control example to determine, based on the vehicle speed, whether or not the engagement mechanism is to be prohibited from entering the disengaged state. In the example illustrated in FIG. 15, it is first determined whether the vehicle speed V is less than a predetermined vehicle speed V1 or not (step S1). The predetermined vehicle speed V1 in step S11 is determined to be slightly higher than a vehicle speed (hereinafter referred to as a lower-limit vehicle speed) at which the sound pressure level inside the vehicle cabin reaches the lower-limit sound pressure level. This is to prevent the vehicle speed V from decreasing to the lower-limit vehicle speed during a period in which the engagement mechanism is completely engaged after the engagement starts, after it is determined that the vehicle speed V is less than the predetermined vehicle speed V1. Note that the vehicle speed V can be found from a detection value of the vehicle speed sensor, a detection value of a wheel speed sensor, or the like.

In a case where the vehicle speed V is less than the predetermined vehicle speed V1 and an affirmative determination is made in step S1, the engagement mechanism is prohibited from entering the disengaged state (step S12), and the process returns. Step S12 is similar to step S2 in FIG. 14.

In contrast, in a case where the vehicle speed V is the predetermined vehicle speed V1 or more and a negative determination is made in step S12, it is determined whether a deceleration G is larger than a predetermined deceleration G1 or not (step S13). The predetermined deceleration G1 can be determined to a deceleration caused when a relatively large deceleration request is made. Further, the predetermined deceleration G1 can be determined to a deceleration at which a time for the vehicle speed V to decrease to the lower-limit vehicle speed is longer than a time after the engagement of the engagement mechanism is started but before the engagement is completed. That is, the predetermined deceleration G1 may be a fixed value or may be a variable value that changes in accordance with the vehicle speed V.

In a case where the deceleration G is larger than the predetermined deceleration G1 and an affirmative determination is made in step S13, and the process shifts to step S12. In contrast, in a case where the deceleration G is the predetermined deceleration G1 or less and a negative determination is made in step S13, the meshing-type engagement mechanism is permitted to enter the disengaged state (step S13), and the process returns. Step S13 is similar to step S3 in FIG. 14.

Figure 16:
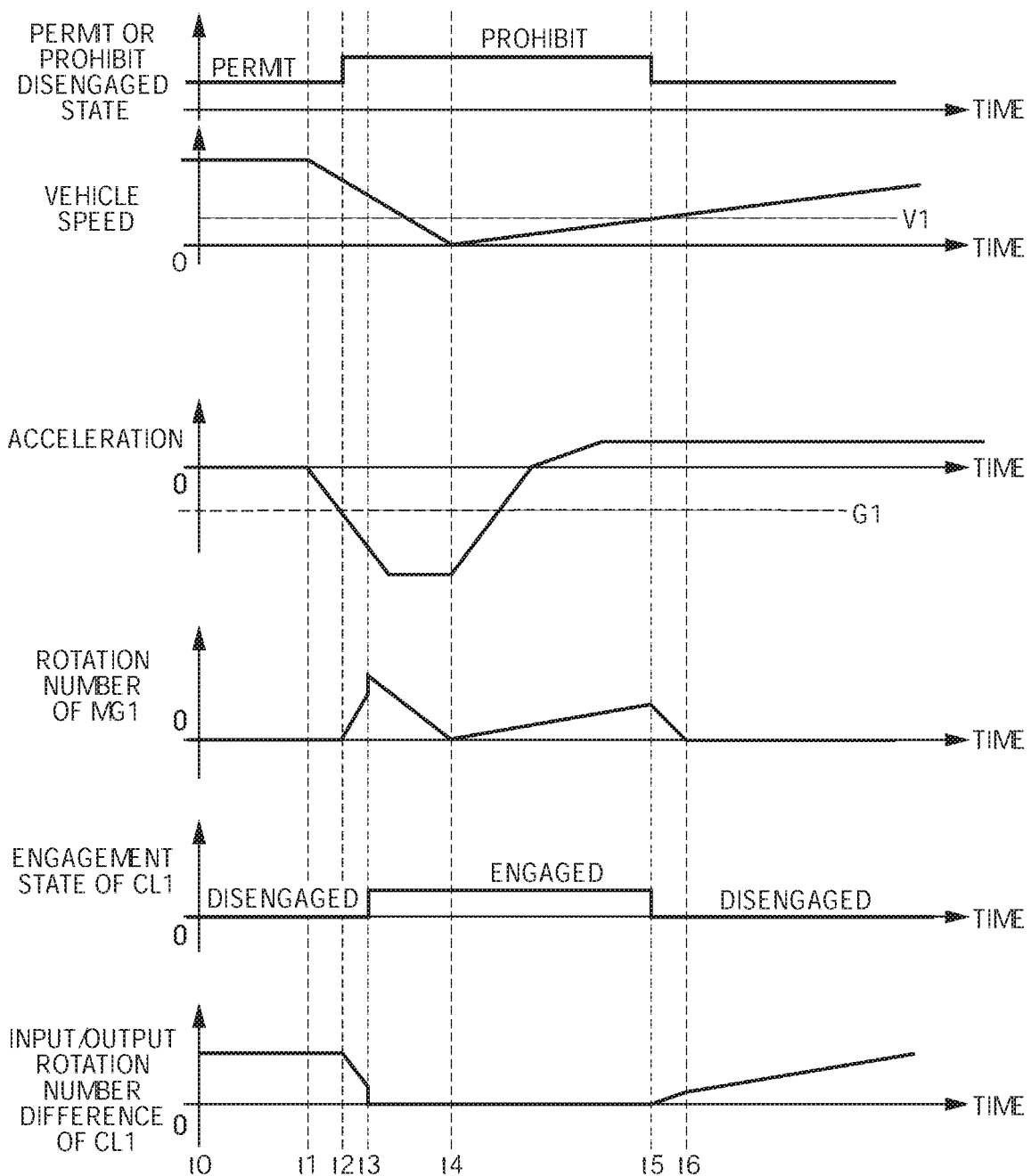
FIG. 16 is a time chart illustrating a change of a permission determination to permit the engagement mechanism to enter the disengaged state at the time when the control example illustrated in FIG. 15 is executed.

FIG. 16 illustrates a change of a permission determination to permit the engagement mechanism to enter the disengaged state at the time when the control example illustrated in FIG. 15 is executed. At time t0 in FIG. 16, the vehicle runs in the separation mode. Accordingly, the first motor 6 is stopped, and the first clutch mechanism CL1 is disengaged. On this account, a difference between an input-side rotation number and an output-side rotation number in the first clutch mechanism CL1 is relatively large. Further, at time t0, an acceleration is maintained at "0" due to steady running. Further, a vehicle speed at time t0 is higher than the predetermined vehicle speed V1 in step S11. As a result, at time t0, the engagement mechanism is permitted to enter the disengaged state.

The vehicle starts to decelerate at time t1. That is, the vehicle speed decreases and the deceleration increases. Note that, in FIG. 16, an acceleration on an acceleration side during forward running is indicated by a positive value, and an acceleration on a deceleration side during forward running is indicated by a negative value. At time t2, the deceleration becomes larger than the predetermined deceleration G1, and an affirmative determination is made in step S13 in FIG. 15. As a result, the engagement mechanism is prohibited from entering the disengaged state.

On this account, in the example illustrated in FIG. 16, the rotation number of the first motor 6 is increased from time t2, so that the difference between the input-side rotation number and the output-side rotation number in the first clutch mechanism CL1 becomes not more than an allowable difference at which the first clutch mechanism CL1 is engaged. Then, at time t3, the difference between the input-side rotation number and the output-side rotation number in the first clutch mechanism CL1 becomes not more than the allowable difference at which the first clutch mechanism CL1 is engaged, so that the first clutch mechanism CL1 is engaged. At this time, a difference occurs to some extent between the input-side rotation number and the output-side rotation number in the first clutch mechanism CL1, so that the rotation number of the first motor 6 increases in stages, and the difference between the input-side rotation number and the output-side rotation number in the first clutch mechanism CL1 changes rapidly.

After the vehicle is stopped temporarily at time t4, the vehicle accelerates again, so that the vehicle speed becomes higher than the predetermined vehicle speed or more at time t5. On this account, at time t5, the engagement mechanism is permitted to enter the disengaged state, so that the first clutch mechanism CL1 is disengaged and the separation mode is established. Note that, in order to reduce an amount of consumed electric power from time t5, the rotation number of the first motor 6 is decreased, and the first motor 6 stops at time t6.

As described above, the first clutch mechanism CL1 is prohibited from entering the disengaged state before the vehicle speed becomes low, so that the first clutch mechanism CL1 is engaged. This makes it possible to yield an effect similar to the control example illustrated in FIG. 14. That is, it is possible to restrain an occurrence of engagement noise of the engagement mechanism in a state where the sound pressure level inside the vehicle cabin is the lower-limit sound pressure level.

Further, in a case where the first clutch mechanism CL1 is engaged in a state where there is a difference between the input-side rotation number and the output-side rotation number in the first clutch mechanism CL1 as illustrated in FIG. 16, engagement shock might be caused in addition to engagement noise. However, by engaging the first clutch mechanism CL1 at the time of deceleration, it is possible to restrain the occupant from having the engagement shock as an uncomfortable feeling.

Note that the vehicle in the embodiment of the disclosure is not limited to the configuration illustrated in FIG. 1, and may have the configuration illustrated in FIG. 2. That is, in a case where the sound pressure level inside the vehicle cabin becomes the lower-limit sound pressure level, the second braking mechanism B2 or the third clutch mechanism CL3 may be prohibited from entering the disengaged state. In that case, in order to fill up the driving force for re-acceleration and the like, some embodiments may prohibit the second braking mechanism B2 from entering the disengaged state.

Further, the vehicle in the embodiment of the disclosure is not limited to the configuration in which drive energy is transmitted from a driving force source to the driving wheels as a mechanical power, but the vehicle may be a vehicle, like a series hybrid vehicle that has been known in the related art, that is configured to run such that a power output from a driving force source is converted into an electric power and the electric power is supplied to a motor. In this case, the vehicle is configured such that the meshing-type engagement mechanism is disengaged so as to interrupt transmission of a torque between an engine as the driving force source and a generator or transmission of a torque between the motor and the driving wheels. Furthermore, the vehicle in the embodiment of the disclosure may be a vehicle including only an engine as a driving force source. In that case, in a case where the sound pressure level inside the vehicle cabin becomes the lower-limit sound pressure level, the vehicle may be configured to prohibit the meshing-type engagement mechanism provided in a transmission mechanism from entering the disengaged state.

What is claimed is:

1. A drive control device for a vehicle including a driving force source, and a meshing-type engagement mechanism configured to selectively set an engaged state or a disengaged state, the engaged state being a state where a power output from the driving force source is transmittable to driving wheels as drive energy, the disengaged state being a state where transmission of the power to the driving wheels as the drive energy is interrupted, the vehicle being configured to change the meshing-type engagement mechanism from the disengaged state to the engaged state by changing from a predetermined running state to another running state, the drive control device comprising
a controller configured to control the meshing-type engagement mechanism,
when the meshing-type engagement mechanism is changed from the disengaged state to the engaged state, the controller being configured to determine whether or not a sound pressure level inside a vehicle cabin becomes a predetermined value or less, and
the controller being configured to prohibit the meshing-type engagement mechanism from entering the disengaged state, when the controller determines that the sound pressure level becomes the predetermined value or less.

2. The drive control device according to claim 1, wherein, when a vehicle speed is a predetermined vehicle speed or less, the controller is configured to determine that the sound pressure level becomes the predetermined value or less.

3. The drive control device according to claim 2, wherein:
when a deceleration of the vehicle is a predetermined deceleration or more, the controller is configured to determine that the sound pressure level becomes the predetermined value or less; and
the predetermined deceleration increases as the vehicle speed increases.

4. The drive control device according to claim 1, wherein, when a deceleration of the vehicle is a predetermined deceleration or more, the controller is configured to determine that the sound pressure level becomes the predetermined value or less.

5. The drive control device according to claim 1, wherein:
the driving force source includes an engine; and
the driving force source further includes a drive motor connected to the driving wheels.

6. The drive control device according to claim 5, further comprising a generator configured to convert a power output from the engine into electrical energy and output the electrical energy to the drive motor,
wherein the meshing-type engagement mechanism is configured to selectively interrupt transmission of a torque between the engine and the generator.

7. The drive control device according to claim 6, further comprising a power split device including a first rotating element to which the engine is connected, a second rotating element to which the generator is connected, and a third rotating element to which the driving wheels are connected, the power split device being configured to split and transmit a torque output from the engine to the generator and the driving wheels, wherein the meshing-type engagement mechanism is configured to selectively interrupt the transmission of the torque from the engine to the driving wheels via the power split device.

8. The drive control device according to claim 7, wherein:
the power split device includes
a plurality of rotating elements including the first rotating element, the second rotating element, and the third rotating element,
a first engagement mechanism configured to connect a first set of any two rotating elements among the rotating elements so that a split ratio of a torque transmitted to a driving wheels side becomes a first split ratio, and
a second engagement mechanism configured to connect a second set of any two rotating elements among the rotating elements so that the split ratio becomes a second split ratio smaller than the first split ratio; and
the meshing-type engagement mechanism includes the first engagement mechanism.

9. The drive control device according to claim 8, wherein one rotating element out of the two rotating elements engaged by the first engagement mechanism and one rotating element out of the two rotating elements engaged by the second engagement mechanism are the same rotating element.

10. The drive control device according to claim 1, wherein:
the driving force source includes a drive motor; and
the meshing-type engagement mechanism is configured to selectively interrupt transmission of a torque between the drive motor and the driving wheels.

11. The drive control device according to claim 10, further comprising:
a third engagement mechanism configured to connect the drive motor to the driving wheels in a torque transmittable manner by connecting a first pair of rotational members so that a transmission ratio between the drive motor and the driving wheels becomes a first predetermined value; and
a fourth engagement mechanism configured to connect the drive motor to the driving wheels in a torque transmittable manner by connecting a second pair of rotational members so that the transmission ratio between the drive motor and the driving wheels becomes a second predetermined value smaller than the first predetermined value, wherein the meshing-type engagement mechanism includes the third engagement mechanism.

12. The drive control device according to claim 1, wherein the meshing-type engagement mechanism is a normal-stay type engagement mechanism configured as follows:
the meshing-type engagement mechanism is configured to change from the disengaged state to the engaged state upon receipt of an engagement signal to change from the disengaged state to the engaged state where a torque is transmittable between the driving force source and the driving wheels;
the meshing-type engagement mechanism is configured to change from the engaged state to the disengaged state upon receipt of a disengagement signal to change from the engaged state to the disengaged state;
when the engagement signal and the disengagement signal are not input in the engaged state, the meshing-type engagement mechanism is configured to maintain the engaged state; and
when the engagement signal and the disengagement signal are not input in the disengaged state, the meshing-type engagement mechanism is configured to maintain the disengaged state.

13. The drive control device according to claim 1, wherein:
the meshing-type engagement mechanism includes an input-side rotational member including first meshing teeth, and an output-side rotational member including second meshing teeth meshing with the first meshing teeth;
the meshing-type engagement mechanism is configured to move either ones of the first meshing teeth and the second meshing teeth toward the other ones of the first meshing teeth and the second meshing teeth, so that the first meshing teeth mesh with the second meshing teeth; and
the meshing-type engagement mechanism is configured such that, when distal ends of the first meshing teeth in a moving direction make contact with the second meshing teeth at a time when the first meshing teeth start to mesh with the second meshing teeth, at least either one of the input-side rotational member and the output-side rotational member rotates to shift a phase of the first meshing teeth from a phase of the second meshing teeth, so that the first meshing teeth mesh with the second meshing teeth.

14. A control method for a vehicle including a driving force source, a meshing-type engagement mechanism, and a controller, the meshing-type engagement mechanism being configured to selectively set an engaged state or a disengaged state, the engaged state being a state where a power output from the driving force source is transmittable to driving wheels as drive energy, the disengaged state being a state where transmission of the power to the driving wheels as the drive energy is interrupted, and the vehicle being configured to change the meshing-type engagement mechanism from the disengaged state to the engaged state by changing from a predetermined running state to another running state,
the control method comprising:
controlling, by the controller, the meshing-type engagement mechanism;
determining, by the controller, when the meshing-type engagement mechanism is changed from the disengaged state to the engaged state, whether or not a sound pressure level inside a vehicle cabin becomes a predetermined value or less; and
prohibiting, by the controller, the meshing-type engagement mechanism from entering the disengaged state, when the controller determines that the sound pressure level becomes the predetermined value or less.

* * * * *

UNITED STATES PATENT AND TRADEMARK OFFICE
CERTIFICATE OF CORRECTION

PATENT NO. : 10,955,050 B2
APPLICATION NO. : 16/274750
DATED : March 23, 2021
INVENTOR(S) : Tatsuya Imamura et al.

Page 1 of 1

It is certified that error appears in the above-identified patent and that said Letters Patent is hereby corrected as shown below:

In the Specification

In Column 15, Line(s) 8, delete "$1/(\mu 1 \times \rho 2)$" and insert --$1/(\rho 1 \times \rho 2)$--, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*